United States Patent [19]
Narazaki et al.

[11] Patent Number: 5,652,495
[45] Date of Patent: Jul. 29, 1997

[54] CONTROLLER FOR PERMANENT MAGNET SYNCHRONOUS MOTOR

[75] Inventors: Kazushige Narazaki, Katano; Tomokuni Iijima, Moriguchi; Yoshiaki Igarashi, Ikoma; Satoshi Tamaki, Hirakata, all of Japan

[73] Assignee: Matsushita Electric Industrial Co., Ltd., Kadoma, Japan

[21] Appl. No.: 445,938

[22] Filed: May 22, 1995

[30] Foreign Application Priority Data

May 25, 1994 [JP] Japan .................... 6-111241
Jan. 27, 1995 [JP] Japan .................... 7-011728

[51] Int. Cl.⁶ .................................................. H02P 1/46
[52] U.S. Cl. .................. 318/716; 318/700; 318/802; 318/701; 318/254
[58] Field of Search ................... 318/798–815, 318/700, 701, 716–719, 254

[56] References Cited

U.S. PATENT DOCUMENTS

| | | | |
|---|---|---|---|
| 4,361,791 | 11/1982 | Plunkett | 318/723 |
| 4,450,395 | 5/1984 | Kawamura et al. | 318/700 |
| 4,649,331 | 3/1987 | Jahns | 318/798 |
| 4,703,245 | 10/1987 | Sakamoto et al. | 318/809 |
| 4,703,246 | 10/1987 | Sakamoto et al. | 318/809 |
| 5,006,768 | 4/1991 | Rozman | 318/254 |
| 5,247,237 | 9/1993 | Koyama et al. | 318/808 |
| 5,296,794 | 3/1994 | Lang et al. | 318/715 |
| 5,448,150 | 9/1995 | Yamamoto et al. | 318/805 |
| 5,504,404 | 4/1996 | Tamaki et al. | 318/432 |

*Primary Examiner*—David S. Martin
*Attorney, Agent, or Firm*—Renner, Otto, Boisselle, Sklar

[57] ABSTRACT

A controller for a permanent magnet synchronous motor which includes a D-axis current command section and a Q-axis current command section. The D-axis current command section increases the command value of the D-axis current so as to set a judged value to be zero by leading the current phase when the judged value is positive. In addition, the D-axis current command section decreases the command value of the D-axis current when the judged value is negative. Moreover, the D-axis current command section holds the command value of the D-axis current at a predetermined minimum value when the decreasing command value of the D-axis current becomes smaller than the predetermined minimum value. The Q-axis current command section is responsible for supplying a command value of the Q-axis current.

35 Claims, 17 Drawing Sheets

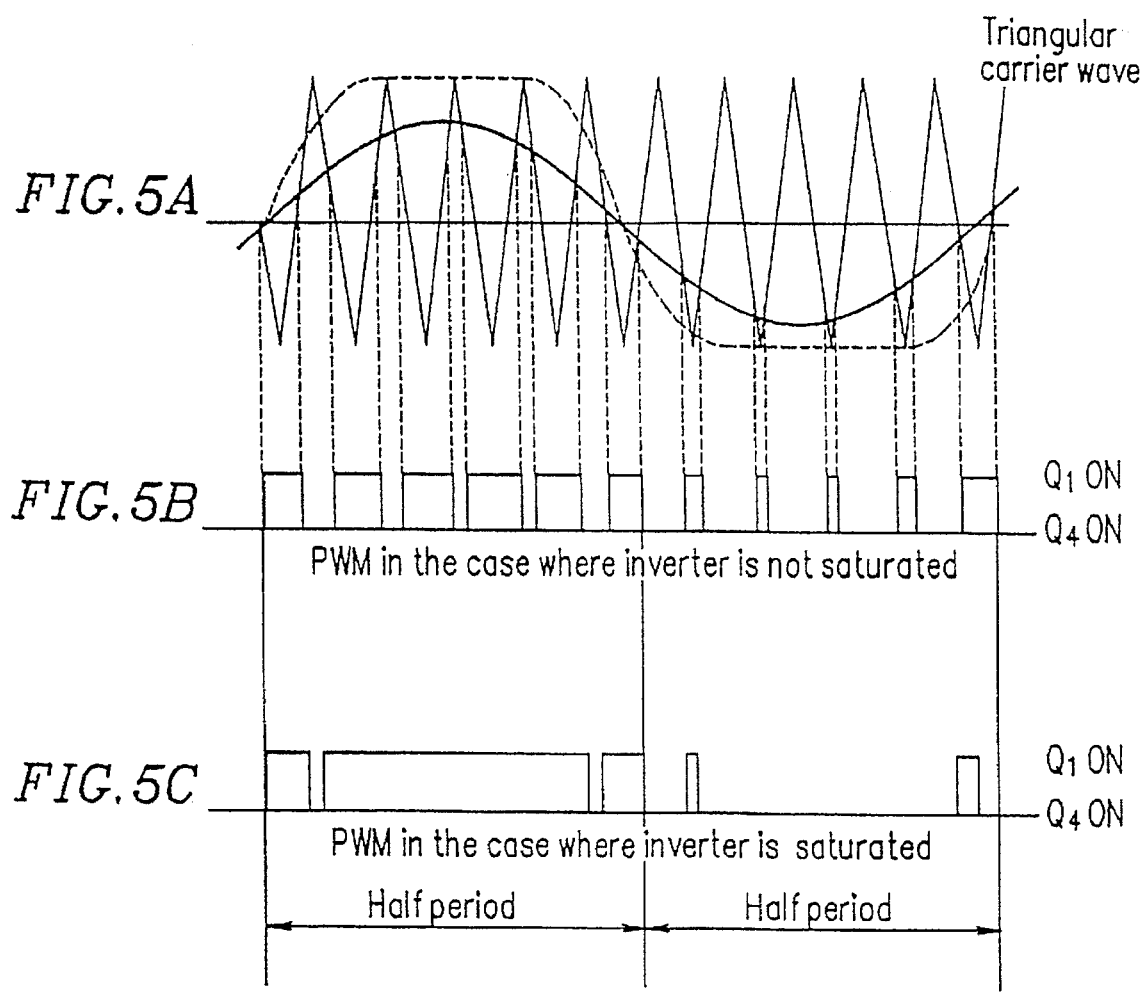

FIG. 6A
Q-axis direction | D-axis direction
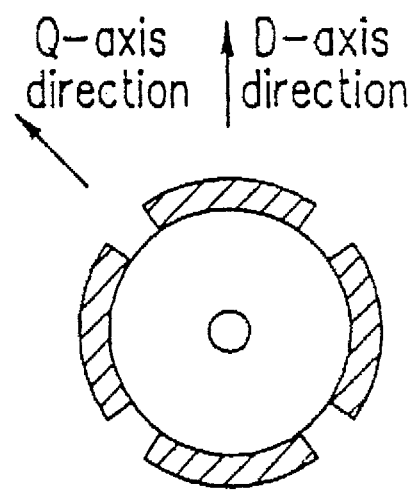
FIG. 6B
Q-axis direction | D-axis direction
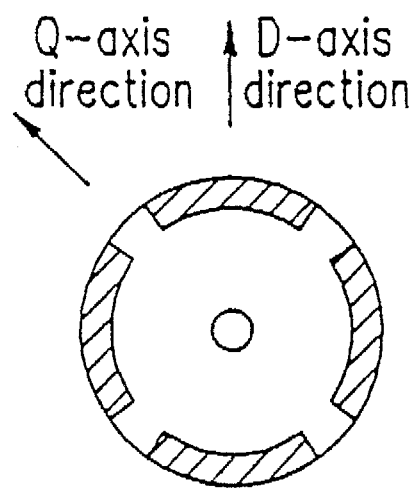
 Permanent magnet

CONTROLLER FOR PERMANENT MAGNET SYNCHRONOUS MOTOR

BACKGROUND OF THE INVENTION

1. Field of the Invention

The present invention relates to a controller for a permanent magnet synchronous motor usable for an electric vehicle and the like. More specifically, the present invention relates to a controller for performing a flux-weakening control or a maximum efficiency control by supplying a direct axis (D-axis) current value to such a synchronous motor in order to maximize the efficiency of the motor.

2. Description of the Related Art

In the proceeding of the Institute of Electrical Engineers of Japan, a Publication of Electric Applications Society IEA-92-30 (Document 1), a flux-weakening control is proposed to be performed by calculating a command value $i_d{}^*$ of a field current in accordance with the following Equation 1.

$$i_d{}^* = -i_{dz}{}^* (\omega - \omega_{base})/(\omega_{max-107\ base}) \qquad (1)$$

where, $\omega_{base}$ indicates a rotation speed of the base, $\omega_{max}$ indicates a maximum rotation speed, $i_{dm}$ indicates a field current at the maximum rotation number $\omega_{max}$.

On the other hand, in the proceeding of the Institute of Electrical Engineers of Japan, No. 74, pp. 310 to 315 (Document 2), a flux-weakening control is proposed to be performed by calculating a command value $i_d{}^*$ of a field current using a target rotation number, a D-axis winding reluctance, a quadrature axis (Q-axis) winding reluctance, a stator winding resistance, an unloaded induced voltage at a unit speed, and the like.

U.S. Pat. Nos. 4,361,791 and 4,649,331 disclose methods for supplying the field current $i_d$ to a motor in accordance with the state of the motor at real time by detecting an error (or the degree of the realization) between the value of a motor torque or a current actually measured by a controller at real time and a command value so as to feedback the error.

According to conventional methods such as those disclosed in Documents 1 and 2, in order to perform a flux-weakening control in a high-speed rotation region, the field current $i_d$ is supplied in accordance with the target rotation number $\omega$ using Equation 1.

However, when a motor is actually operated, the constant of the motor is varied in accordance with the variation of the resistance value under various operational conditions and the passage of time. For example, if the temperature in the vicinity of an ambient temperature increases by 70 degrees, then the electric resistance of the motor increases by about 30%. Accordingly, the field current $i_d$ obtained by Equation 1 used by these conventional methods is not always an optimal field current $i_d$.

Therefore, in order to output a high torque at a high-speed rotation, it has conventionally been required to supply an excessive amount of field current $i_d$ in consideration of the variation of these characteristics. For example, when the inductance is 4 mH, the stator frequency is 133 Hz, and the applied voltage is 80 V, the field current $i_d$ required for realizing an inverse electromotive voltage of 80 V and a torque current of iqlA is 1.95 A at the resistance of 1$\Omega$, or 2.63 A at the resistance of 1.3 $\Omega$.

Consequently, the excessive amount of the field current $i_d$ increase the copper loss, so that the efficiency is degraded.

On the other hand, according to the methods for supplying the field current $i_d$ to be obtained by the feedback control as disclosed in Japanese Laid-Open Patent Publications Nos. 57-196896 and 62-7396, the design rule or the control operation to be insufficient for realizing a stable operation to be executed easily. That is to say, the methods have the following problems.

1. According to these methods, very large variation of the characteristics can not be processed easily.
2. These method fail to provide a method for improving the response characteristics.
3. It is impossible to supply a field current optimized for the dynamic operation and the regenerative operation of the motor, respectively.
4. Other kinds of method for improving the efficiency excluding the calculation of the field current $i_d$ by using the feedback control are not mentioned.
5. In the case where the voltage of a battery is lowered and the terminal voltage to be supplied to the synchronous motor is also lowered, the amount of the D-axis current becomes excessive with respect to that of the total current, so that the efficiency is degraded.
6. Only one reference value can not allow for satisfying the maximization of the efficiency and the maximization of the torque at the same time.
7. Since it is impossible to control the D-axis current and the Q-axis current separately, the response characteristics of one of the currents can not help being sacrificed.
8. In the case where a failure is generated in the circuit or in the system, the processing to be performed is not definitely described.

SUMMARY OF THE INVENTION

The controller for a permanent magnet synchronous motor of the invention includes: a current command section for calculating current command values in respective phases of a stator from a command value of a direct-axis stator current (a D-axis current) and a command value of a quadrature-axis stator current (a Q axis current), thereby outputting the command values; an input application section for supplying a current to the respective phases based on the command values of the currents in the respective phases; a saturation degree output section for producing a saturation degree indicating an additional amount of the current to be supplied to the respective phases by the input application section; a reference output section for outputting a reference value of the saturation degree; a judged value output section for calculating a judged value by subtracting the reference value of the saturation degree from the saturation degree; a D-axis current command section for leading the current phase and increasing the command value of the D-axis current so as to set the judged value to be zero when the judged value is positive; decreasing the command value of the D-axis current when the judged value is negative; and holding the command value of the D-axis current at a predetermined minimum value when the decreasing command value of the D-axis current becomes smaller than the predetermined minimum value; and a Q-axis current command section for supplying a command value of the Q-axis current.

In one embodiment, the saturation degree output section produces the saturation degree based on a difference between at least one of the command values of the stator currents in the respective phases and values of phase currents of the permanent magnet synchronous motor.

In another embodiment, the saturation degree output section produces the saturation degree based on a value obtained by integrating a difference between the command value of the Q-axis current and a value of the Q-axis current flowing through the stator of the permanent magnet synchronous motor.

In still another embodiment, the saturation degree output section includes an integrator for integrating the difference, the integrator including a device to be changed into the controller in order to adjust an integration ratio of the integrator.

In still another embodiment, the saturation degree output section produces the saturation degree based on a difference between a torque command value calculated based on at least a current command value and an actual value of a torque of the permanent magnet synchronous motor.

In still another embodiment, the saturation degree output section produces the saturation degree based on a difference between a value obtained by integrating a command value of a current in at least one phase and a value obtained by integrating the command value of the phase current flowing through the stator of the permanent magnet synchronous motor.

In still another embodiment, in a case where the judged value is positive, the D-axis current command section increases the command value of the D-axis current; and the D-axis current command section sets the command value of the D-axis current to be a predetermined maximum value when the increasing command value of the D-axis current is larger than the predetermined maximum value. In a case where the judged value is negative, the D-axis current command section decreases the command value of the D-axis current; and the D-axis current command section sets the command value of the D-axis current to be a predetermined minimum value of the D-axis current when the decreasing command value of the D-axis current is smaller than the predetermined minimum value.

In still another embodiment, in a case where the judged value is positive, the D-axis current command section increases the command value of the D-axis current; in a case where the judged value is negative, the D-axis current command section decreases the command value of the D-axis current; and in a case where the decreasing command value of the D-axis current is smaller than a predetermined minimum value of the D-axis current, the D-axis current command section sets the command value of the D-axis current to be the predetermined minimum value. The Q-axis current command section selects a smaller one from a value obtained by vector subtracting the command value of the D-axis current from a predetermined maximum value of a synthesized current value obtained by vector adding the command value of the D-axis current and the command value of the Q axis current, and the command value of the Q-axis current.

In still another embodiment, the controller for a permanent magnet synchronous motor of the invention includes: a speed detection section for detecting a rotation speed of the permanent magnet synchronous motor; a variation timing output section for outputting a timing for forcibly varying the command value of the D-axis current, in a case where the command value of the D-axis current is within a certain range and a value of the rotation speed is within a certain range during a certain period; a D-axis current variation section for varying the command value of the D-axis current by holding at a constant value a synthesized current command value obtained by synthesizing the command value of the D-axis current and the command value of the Q-axis current, when the varied timing is output; and a D-axis current update section for updating the command value of the D-axis current. After the D-axis current variation section varies the command value of the D-axis current, when the rotation speed becomes larger than a rotation speed before the command value of the D-axis current is varied, the D-axis current update section performs a first operation of using the command value of the D-axis current after the command value of the D-axis current is varied; and when the rotation speed becomes smaller than the rotation speed before the command value of the D-axis current is varied, the D-axis current update section performs a second operation of using the command value of the D-axis current before the command value of the D-axis current is varied. The D-axis current update section repeatedly performs the first operation or the second operation during the period permitted by the variation timing output section. In a case where the D-axis current update section updates the command value of the D-axis current and the judged value is positive, the D-axis current update section changes the reference value output from the reference output section into a reference value newly calculated; and in a case where the D-axis current update section updates the command value of the D-axis current and the judged value is negative, the D-axis current update section sets a predetermined minimum value of the D-axis current, or a coefficient of an equation for calculating the command value of the D-axis current, based on a value output to the D-axis current command section from the D-axis current update section.

In still another embodiment, the controller for a permanent magnet synchronous motor of the invention includes a current initial value output section for outputting an initial value of the D-axis current obtained from the command value of the Q-axis current, in a case where a command value of the Q-axis current becomes equal to or larger than a predetermined value.

In still another embodiment, the controller for a permanent magnet synchronous motor of the invention further includes a changing ratio output section for determining and outputting a changing ratio of the command value of the D-axis current. The changing ratio output section outputs a predetermined constant changing ratio or a changing ratio calculated from the judged value and the command value of the D-axis current. In a case where the judged value is positive, the D-axis current command section increases the command value of the D-axis current based on the changing ratio, while in a case where the command value of the D-axis current becomes larger than a predetermined maximum value, the D-axis current command section holds the command value of the D-axis current at the predetermined maximum value. In a case where the judged value is negative, the D-axis current command section decreases the command value of the D-axis current based on the changing ratio, while in a case where the command value of the D-axis current becomes smaller than a predetermined minimum value, the D-axis current command section holds the command value of the D-axis current at the predetermined minimum value.

In still another embodiment, the changing ratio when the judged value is positive is larger than the changing ratio when the judged value is negative.

In still another embodiment, the changing ratio output section includes at least two changing ratios and the at least two changing ratios are selected.

In still another embodiment, the controller for a permanent magnet synchronous motor of the invention further includes a dynamic/regenerative mode judging section for judging whether an operational mode of the permanent magnet synchronous motor is dynamic or regenerative. The changing ratio output section determines the changing ratio of the command value of the D-axis current rent based on the judged mode.

In still another embodiment, the changing ratio of the command value of the D-axis current in the dynamic mode is smaller than the changing ratio of the command value of the D-axis current in the regenerative mode.

In still another embodiment, the reference output section varies the reference value based on an output from the dynamic/regenerative mode judging section.

In still another embodiment, in a case where the judged value is positive, the D-axis current command section increases the command value of the D-axis current based on the changing ratio, while in a case where the command value of the D-axis current becomes larger than a predetermined maximum value, the D-axis current command section holds the command value of the D-axis current at the predetermined maximum value; and in a case where the judged value is negative, the D-axis current command section decreases the command value of the D-axis current based on the changing ratio, while in a case where the command value of the D-axis current becomes smaller than a predetermined minimum value, the D-axis current command section holds the command value of the D-axis current at the predetermined minimum value. The dynamic/regenerative mode judging section produces a signal indicating a variation of the dynamic or regenerative operational mode, thereby varying the command value of the D-axis current from a previous command value of the D-axis current based on at least one of the rotation speed of the permanent magnet synchronous motor and the command value of the Q-axis current.

In still another embodiment, in a case where a permission value of a braking torque of the permanent magnet synchronous motor is smaller than a predetermined value, the D-axis current command section prevents an abrupt decrease in the command value of the D axis current in order to suppress a decrease in the D-axis current for causing a reluctance torque generating in accordance with a decrease in a torque command value.

According to another aspect of the invention, a controller for a permanent magnet synchronous motor is provided. The controller includes: a current command section for calculating current command values in respective phases of a stator from a command value of a direct-axis stator current (a D-axis current) and a command value of a quadrature-axis stator current (a Q-axis current), thereby outputting the command values; an input application section for supplying a current to the respective phases based on the current command values in the respective phases; a dynamic/ regenerative mode judging section for judging whether an operational mode of the permanent magnet synchronous motor is dynamic or regenerative; a D-axis current command section for outputting a command value of the D-axis current in order to generate a dynamic reluctance torque equal to or larger than zero in the permanent magnet synchronous motor, in a case where the dynamic/ regenerative mode judging section judges the operational mode to be regenerative and a rotation speed and a torque of the permanent magnet synchronous motor do not exist in a flux-weakening region; and a Q-axis current command section for providing a command value of the Q-axis current.

According to still another aspect of the invention, a controller for a permanent magnet synchronous motor is provided. The controller includes: a current command section for calculating current command values in respective phases of a stator from a command value of a direct-axis stator current (a D-axis current) and a command value of a quadrature-axis stator current (a Q-axis current), thereby outputting the command values; an input application section for supplying a current to the respective phases based on the current command values in the respective phases; a dynamic/regenerative mode judging section for judging whether an operational mode of the permanent magnet synchronous motor is dynamic or regenerative; a D-axis current command section for providing the command value of the D-axis current in a case where the dynamic/ regenerative mode judging section judges the operational mode to be regenerative; and a Q-axis current command section for reducing the command value of the Q-axis current in accordance with an increment of the command value of the D-axis current caused by a generation of a reluctance torque in a case where the command value of the D-axis current is not zero.

According to still another aspect of the invention, a controller for a permanent magnet synchronous motor is provided. The controller includes: a current command section for calculating current command values in respective phases of a stator from a command value of a direct-axis stator current (a D-axis current) and a command value of a quadrature-axis stator current (a Q-axis current), thereby outputting the command values; an input application section for supplying a current to the respective phases based on the current command values in the respective phases; a saturation degree output section for producing a saturation degree indicating an additional amount of the current to be supplied to the respective phases by the input application section; a reference output section for outputting a reference value of the saturation degree; a judged value output section for outputting a judged value by subtracting the reference value of the saturation degree from the saturation degree; a voltage measuring section for measuring a voltage applied to an inverter, thereby outputting a value of the measured voltage; a D-axis current maximum value output section for outputting a maximum command value of the D-axis current based on the value of the measured voltage; a D-axis current command section for increasing the command value of the D-axis current when the judged value is positive; holding the command value of the D-axis current at the maximum value of the D-axis current when the increasing command value of the D axis current becomes larger than the maximum value of the D-axis current; decreasing the command value of the D-axis current when the judged value is negative; and holding the command value of the D-axis current at a predetermined minimum value of the decreasing D-axis current when the decreasing command value of the D-axis current becomes smaller than the predetermined minimum value of the D-axis current; and a Q-axis current command section for providing a command value of the Q-axis current.

In one embodiment, the D-axis current maximum value output section reduces the maximum command value of the D-axis current if the value of the measured voltage decreases.

According to still another aspect of the invention, a controller for a permanent magnet synchronous motor is provided. The controller includes: a current command section for calculating current command values in respective phases of a stator from a command value of a direct-axis stator current (a D-axis current) and a command value of a quadrature-axis stator current (a Q-axis current), thereby outputting the command values; an input application section for supplying a current to the respective phases based on the current command values in the respective phases; a voltage measuring section for measuring a voltage applied to the permanent magnet synchronous motor, thereby outputting a value of the measured voltage; a D-axis current command section for reducing a maximum command value of the D-axis current if the value of the measured voltage decreases; and a Q-axis current command section for providing a command value of the Q-axis current.

According to still another aspect of the invention, a controller for a permanent magnet synchronous motor is provided. The controller includes: a current command section for calculating current command values in respective phases of a stator from a command value of a direct-axis stator current (a D-axis current) and a command value of a quadrature-axis stator current (a Q-axis current), thereby outputting the command values; an input application section for supplying a current to the respective phases based on the current command values in the respective phases; a saturation degree output section for producing a saturation degree indicating an additional amount of the current to be supplied to the respective phases by the input application section; an operational state determining section for outputting one of two operational states where an efficiency and a torque are respected, respectively; a reference output section for outputting a reference value of the saturation degree based on the operational state; a judged value output section for outputting a judged value by subtracting the reference value of the saturation degree from the saturation degree; a D-axis current command section for leading a current phase and increasing the command value of the D-axis current so that the judged value becomes zero when the judged value is positive; and a Q-axis current command section for providing a command value of the Q-axis current.

In one embodiment, a reference value when the operational state determining section outputs the operational state where the efficiency is respected is larger than a reference value when the operational state determining section outputs the operational state where the torque is respected.

In another embodiment, in the case where at least one of a rotation speed and a current of the permanent magnet synchronous motor exceeds each predetermined value, the operational state determining section determines the operational state to be a state where the torque is respected, and the reference output section outputs a reference value smaller than a reference value in a case where the efficiency is respected.

According to still another aspect of the invention, a controller for a permanent magnet synchronous motor is provided. The controller includes: a current command section for calculating current command values in respective phases of a stator from a command value of a direct-axis stator current (a D-axis current) and a command value of a quadrature-axis stator current (a Q-axis current), thereby outputting the command values; an input application section for supplying a current to the respective phases based on the current command values in the respective phases; an operational state determining section for outputting one of two operational states where an efficiency and a torque are respected, respectively; a D-axis current command section for providing a command value of the D-axis current so that a command value of the D-axis current in a case where the efficiency is respected is smaller than a command value of the D-axis current in a case where the torque is respected; and a Q-axis current command section for providing a command value of the Q-axis current.

According to still another aspect of the invention, a controller for a permanent magnet synchronous motor is provided. The controller includes: a current command section for calculating current command values in respective phases of a stator from a command value of a direct-axis stator current (a D-axis current) and a command value of a quadrature-axis stator current (a Q-axis current), thereby outputting the command values; an input application section for supplying a current to the respective phases based on the current command values in the respective phases; a saturation degree output section for producing a saturation degree indicating an additional amount of the current supplied to the respective phases by the input application section; a reference output section for outputting a reference value of the saturation degree; a D-axis reference output section for outputting a reference value of the D-axis in accordance with the saturation degree; a Q-axis reference output section for outputting a reference value of the Q-axis in accordance with the saturation degree; a D-axis judged value output section for outputting a judged value of the D-axis based on a value obtained by subtracting the reference value of the D-axis from the saturation degree; a Q-axis judged value output section for outputting a judged value of the Q-axis based on a value obtained by subtracting the reference value of the Q-axis from a processed value of the saturation degree; a D-axis current command section for increasing the command value of the D-axis current in a case where the judged value of the D-axis is positive; holding the command value of the D-axis current at a predetermined maximum value in a case where the increasing command value of the D-axis current becomes larger than the predetermined maximum value; decreasing the command value of the D-axis current in a case where the judged value of the D-axis is negative; and holding the command value of the D-axis current at a predetermined minimum value in a case where the command value of the decreasing command value of the D-axis current becomes smaller than the predetermined minimum value; a Q-axis current command section for providing a command value of the Q-axis current; and a Q-axis current variation section for decreasing the command value of the Q-axis current commanded by the Q-axis current command section and regarding the decreasing command value of the Q-axis current as a varied command value of the Q-axis current in a case where the judged value of the Q-axis is positive and the command value of the D-axis current is the predetermined maximum value; and for increasing the command value of the Q-axis current in a case where the judged value of the Q-axis is negative, the command value of the D-axis current is the predetermined maximum value, and the varied command value of the Q-axis current is equal to or smaller than the command value of the Q-axis current commanded by the Q-axis current command section.

In one embodiment, the reference value of the D-axis output from the D-axis reference output section is smaller than the reference value of the Q-axis output from the Q-axis reference output section.

According to still another aspect of the invention, a controller for a permanent magnet synchronous motor is provided. The controller includes: a current command section for calculating current command values in respective phases of a stator from a command value of a direct-axis stator current (a D-axis current) and a command value of a quadrature axis stator current (a Q-axis current), thereby outputting the command values; an input application section for supplying a current to the respective phases based on the current command values in the respective phases; a saturation degree output section for producing a saturation degree indicating an additional amount of the current to be supplied to the respective phases by the input application section; an operational state determining section for outputting one of two operational states where an efficiency and a torque are respected, respectively; a reference output section for outputting a reference value of the saturation degree based on the operational state; a judged value output section for outputting a judged value obtained by subtracting the reference value of the saturation degree from the saturation degree; a first D-axis current command section for leading a current phase and increasing the command value of the D-axis current so that a judged value becomes zero if the judged value is positive; a failure detection section for detecting a failure of a circuit or an operation; a second D-axis current command section for calculating the command value of the D-axis current based on a predetermined table or operation equation; a Q-axis current command section for providing a command value of the Q-axis current; and a D-axis current selection section for selecting the command value of the D-axis current output from the first D-axis current command section in a case where the failure detection section does not detect a failure of a circuit or an operation; and for selecting the command value of the D-axis current output from the second D-axis current command section in a case where the failure detection section detects a failure of a circuit or an operation.

In one embodiment, the saturation degree output section produces the saturation degree based on a value obtained by integrating a difference between a current in at least one phase and a current command value in a phase corresponding to the at least one phase.

In another embodiment, the saturation degree output section further includes an integrator for integrating the difference, and the integrator includes a device to be changed into the controller for adjusting a ratio of the integration.

In still another embodiment, in a case where the judged value is positive, the D-axis current command section increases the command value of the D-axis current; while, in a case where the increasing command value of the D-axis current becomes larger than a predetermined maximum value, the D-axis current command section holds the command value of the D-axis current at the predetermined maximum value. In a case where the judged value is negative, the D-axis current command section decreases the command value of the D-axis current; while, in a case where the rotation speed of the permanent magnet synchronous motor is equal to or smaller than a predetermined rotation speed, the D-axis current command section sets the command value of the D-axis current to be a predetermined minimum value.

In still another embodiment, the reference output section varies the reference value based on at least one of the current command values in the respective phases and the rotation speed of the permanent magnet synchronous motor.

In the controller according to the present invention, a judged value output section first produces a judged value for increasing/reducing the D-axis current $i_d$ at real time based on the saturation degree of the inverter. Then, a D-axis current command section increases the command value of the D-axis current when the judged value is positive, and holds the command value at a predetermined maximum value when the command value of the increasing D-axis current exceeds the predetermined maximum value. On the other hand, when the judged value is negative and the command value of the D-axis current becomes smaller than a predetermined minimum value, or when the rotation speed becomes equal to or smaller than a predetermined rotation speed, the D-axis current command section holds the command value at the predetermined minimum value. In this way, according to the invention, the D-axis current $i_d$ is obtained by a feedback differential control operation, and in addition, various conditions for stabilizing the operation such as the setting of the rotation speed for starting the flux-weakening control are determined. Therefore, an optimal D-axis current $i_d$ for maximizing the efficiency can be supplied stably at real time in accordance with the present state of the motor. Consequently, it is possible to provide a highly efficient controller for a permanent magnet synchronous motor.

Thus, the invention described herein makes possible the advantage of providing a controller for a permanent magnet synchronous motor allowing for performing a highly efficient flux-weakening control in view of the safety and the response characteristics.

This and other advantages of the present invention will become apparent to those skilled in the art upon reading and understanding the following detailed description with reference to the accompanying figures.

BRIEF DESCRIPTION OF THE DRAWINGS

FIG. 3B shows a phase current command value input to the proportional integrator, while

FIGS. 5A, 5B and 5C shows the variations of a current error signal for pulse width modulation (PWM) obtained in the cases where the inverter is saturated and is not saturated.

FIG. 6A shows a rotor for a non-salient pole motor, while FIG. 6B shows a rotor for an inverse salient-pole motor.

DESCRIPTION OF THE PREFERRED EMBODIMENTS

Hereinafter, the present invention will be described by way of illustrative example with reference to the accompanying drawings.

EXAMPLE 1

A controller for a permanent magnet synchronous motor (hereinafter, simply referred to as a "synchronous motor") according to a first example of the invention will be described with reference to the drawings.

Figure 1:
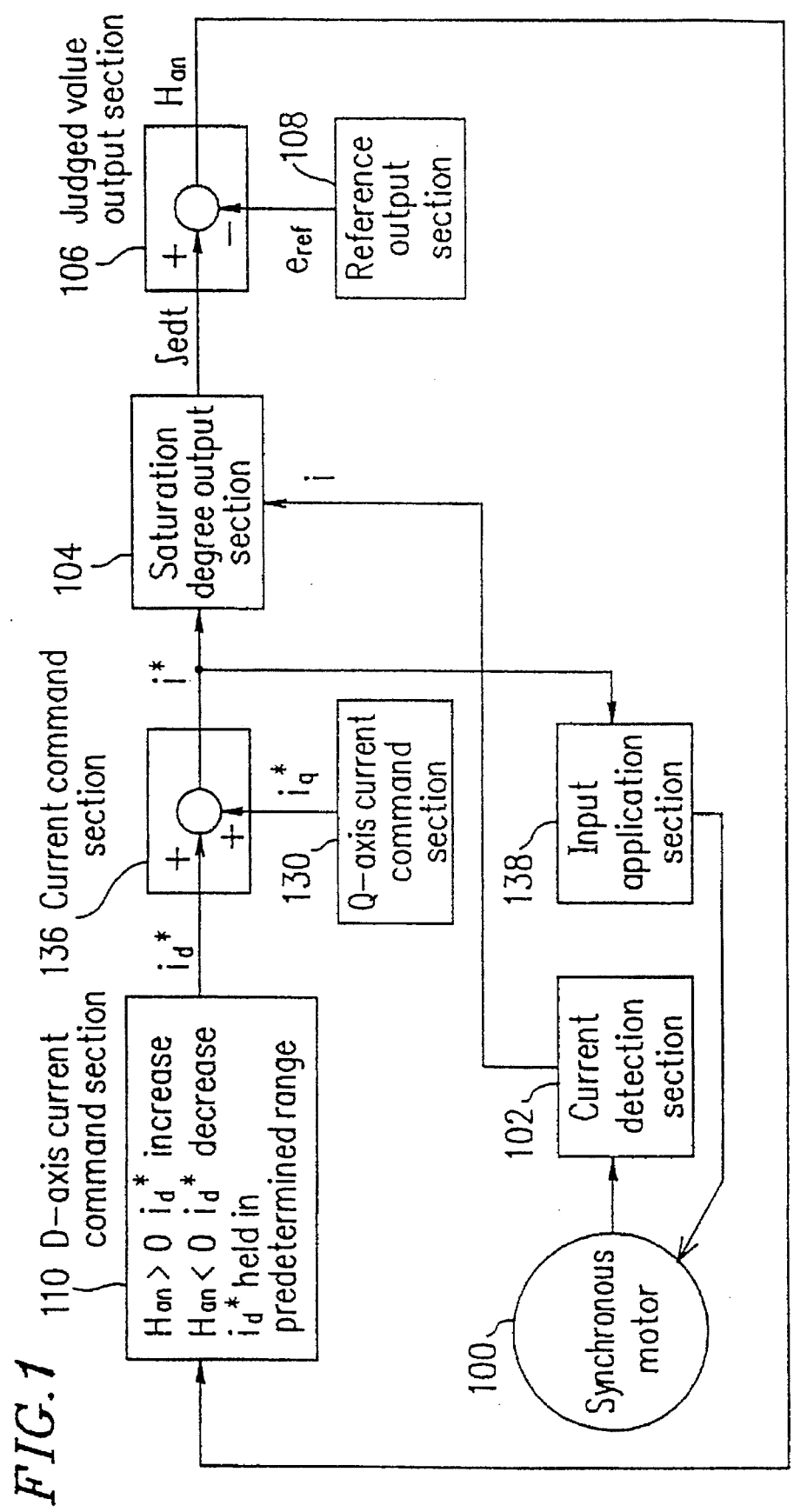
FIG. 1 is a block diagram showing the configuration of a controller for a permanent magnet synchronous motor according to a first example of the invention.

FIG. 1 is a block diagram showing the configuration of a controller according to the first example.

As shown in FIG. 1, the controller of the first example includes: a saturation degree output section 104; a judged value output section 106; a reference output section 108; a D-axis current command section 110; a Q-axis current command section 130; a current command section 136; and an input application section 138.

This controller may also include a current detection section 102 for detecting the current of the synchronous motor 100.

Next, a flux-weakening control will be briefly described with reference to FIGS. 2A to 2C based on the following Equation 2.

A fundamental equation of a synchronous motor 100 (Equation 2) is well known.

$$V^2 = (\Psi\omega + Ri_q - \omega L_d i_d)^2 + (Ri_d + \omega L_q i_q)^2 \quad (2)$$

where, V indicates a terminal voltage supplied to the motor 100; $\omega$ indicates an angular speed; R indicates a stator winding resistance per phase; $\Psi$ indicates an unloaded induced voltage at a unit speed; $L_d$ and $L_q$ respectively indicate the phase inductances of the D-axis and the Q-axis; $i_d$ indicates a direct axis stator current (or a D-axis current); and $i_q$ indicates a quadrature axis stator current (or a Q-axis current).

Figure 2A:
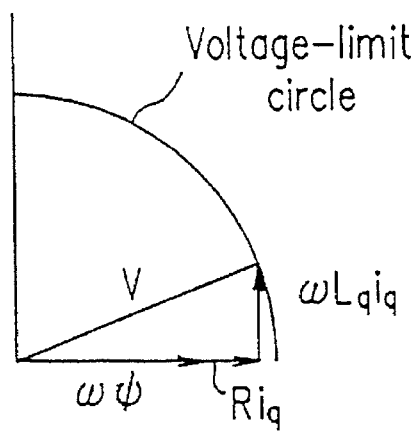
FIGS. 2A to 2C illustrate a flux-weakening control in a dynamic mode by way of vectors.
Figure 2B:
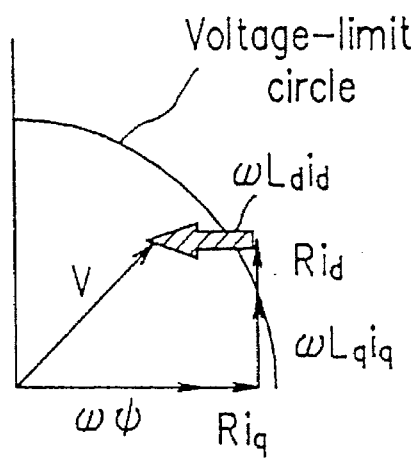
Figure 2C:
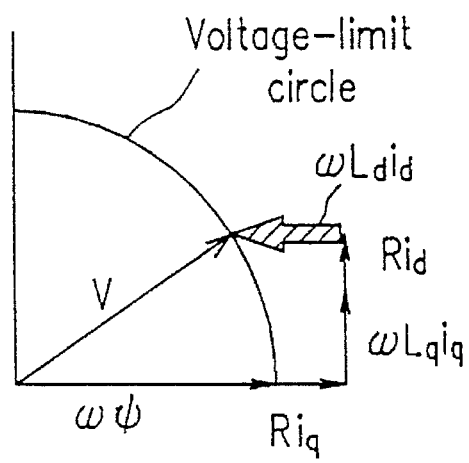

In FIGS. 2A to 2C, the D-Q coordinates indicate the rotation coordinates, while $i_d$ indicates the amount of direct current of the D-axis current and $i_q$ indicates the amount of direct current of the Q-axis current.

The synchronous motor 100 operates in different manners when the operational mode of the synchronous motor 100 is a dynamic mode and when the operational mode of the synchronous motor 100 is a regenerative mode. Accordingly, these two operational modes will be described below. The "dynamic mode" herein refers to the mode where a mechanical output is generated from the synchronous motor 100 and a power is supplied from the power supply to the synchronous motor 100 (in the case of using a battery, the battery is discharged in the mode). On the other hand, the "regenerative mode" herein refers to the mode where the motor is converting mechanical energy into electrical energy and the power is supplied to the power supply (in the case of using a battery, the battery is charged in the mode).

In the case where the synchronous motor 100 operates in the dynamic mode, as indicated by the flux-weakening control vectors (FIG. 2A), as the rotation speed $\omega$ of the synchronous motor 100 increases, the induced voltage $\omega\Psi$ also increases. When the voltage value v obtained as the sum vector of the induced voltages $\omega\Psi$, $R \cdot i_q$ and $\omega \cdot L_q \cdot i_q$ reaches the voltage-limit circle, the rotation speed $\omega$ of the synchronous motor 100 reaches the maximum value. In other words, the rotation speed of the synchronous motor 100 can not be increased over $\omega$.

If a battery or the like is used as the power supply, then the degradation of the battery will vary the terminal voltage and the current value thereof. However, it will be assumed that the terminal voltage of the battery (i.e., the radius of the voltage-limit circle) is constant for simplification.

Next, the case where the rotation speed of the synchronous motor 100 is increased will be described. As shown in FIG. 2B, by supplying the D-axis current $i_d$ to the synchronous motor 100, a voltage $\omega \cdot L_d \cdot i_d$ is generated in a backward direction to the voltage-limit circle. As a result, a voltage margin for increasing the rotation speed is generated in the synchronous motor 100 (FIG. 2B). In the case where the rotation speed of the synchronous motor 100 is constant, a torque current for generating a torque can be supplied to the synchronous motor 100 by the amount corresponding to the generated voltage margin, so that an even larger amount of torque can be generated in the synchronous motor 100 (FIG. 2C). Herein, the D-axis current $i_d$ is defined to be larger than zero in the forward direction of the current phase. As described above, a flux-weakening control is a control for generating a voltage margin by supplying a D-axis current to the synchronous motor 100. An exemplary flux-weakening control will be described with reference to U.S. Pat. No. 4,649,331.

In order to generate a voltage margin, the D-axis current $i_d$ is a current in a sufficient amount for the value V of the terminal voltage supplied to the terminal of the motor to return to the voltage-limit circle. Thus, the amount of the D-axis current $i_d$ is preferably as small as possible. If the D-axis current $i_d$ in an amount exceeding the indispensable amount is supplied to the synchronous motor 100, then the copper loss is increased, and the efficiency of the synchronous motor 100 deteriorates. This is because a torque would not be generated if the D-axis current were supplied to a non-salient pole motor (or a generally used motor) as shown in FIG. 6A. In the case of using such a non-salient pole motor, when the indispensable amount of D-axis current $i_d$ is supplied to the non-salient pole motor, the non-salient pole motor is driven at high efficiency.

The operation in the regenerative mode can be understood in the same manner as the operation in the dynamic mode.

FIG. 6B shows an inverse salient-pole motor. In the case where a D-axis current $i_d$ is supplied to an inverse salient-pole motor or a salient-pole motor, then a reluctance torque as will be described later is generated. Therefore, if an appropriate amount of D-axis current $i_d$ is supplied in accordance with the phase inductances $L_d$ and $L_q$, then the efficiency of the synchronous motor 100 is improved.

Next, the saturation inverter will be described with reference to FIGS. 3A to 3C, FIG. 4 and FIG. 5.

The current command values $i_u^*(t)$, $i_v^*(t)$ and $i_w^*(t)$ having the phases which are different from each other by 120 degrees can be expressed by the following equations by using a D-axis current command value and a Q-axis current command value. Hereinafter, in the case where it is not particularly necessary to indicate that a value is varied in accordance with the passage of time, e.g., an alternate current value, (t) will be omitted. In addition, * denotes a command value.

$$i_U^*(t) = -(2/3)^{1/2}\{i_d^* \cdot \cos\omega t + i_q^* \cdot \sin\omega t\}$$
$$i_V^*(t) = -(2/3)^{1/2}\{i_d^* \cdot \cos(\omega t - 2\pi/3) + i_q^* \cdot \sin(\omega t - 2\pi/3)\}$$
$$i_W^*(t) = -(2/3)^{1/2}\{i_d^* \cdot \cos(\omega t + 2\pi/3) + i_q^* \cdot \sin(\omega t + 2\pi/3)\}$$

Figure 3A:
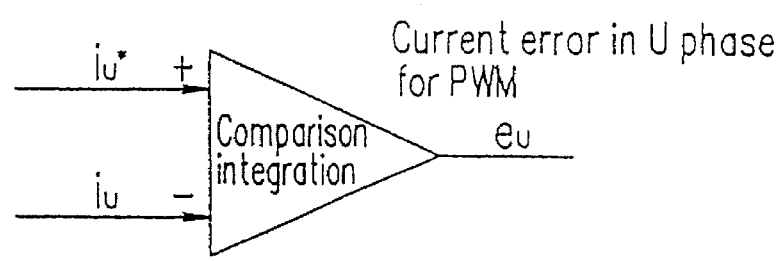
FIG. 3A schematically shows a proportional integrator.

The values $i_u(t)$, $i_v(t)$ and $i_w(t)$ of the current actually running through the stator of the synchronous motor 100 via a pair of terminals of the controller is detected by a current detection section 102. The detected current values $i_u(t)$, $i_v(t)$ and $i_w(t)$ are output to the saturation degree output section 104. The saturation degree output section 104 has at least one of the proportional integrators as shown in FIG. 3A. The current command value $i_u^*(t)$ ($i_v^*(t)$ or $i_w^*(t)$) is input to one terminal of the proportional integrator, while the detected current value $i_u(t)$ ($i_v(t)$ or $i_w(t)$) is input to the other terminal of the proportional integrator. The proportional integrator proportionally integrates the difference between the current command value $i_u^*(t)$ ($i_v^*(t)$ or $i_w^*(t)$) and the detected current value $i_u(t)$ ($i_v(t)$ or $i_w(t)$), so as to output as the current error $e_u(t)$ ($e_v(t)$ or $e_w(t)$) for the pulse width modulation (PWM).

Figure 3B:
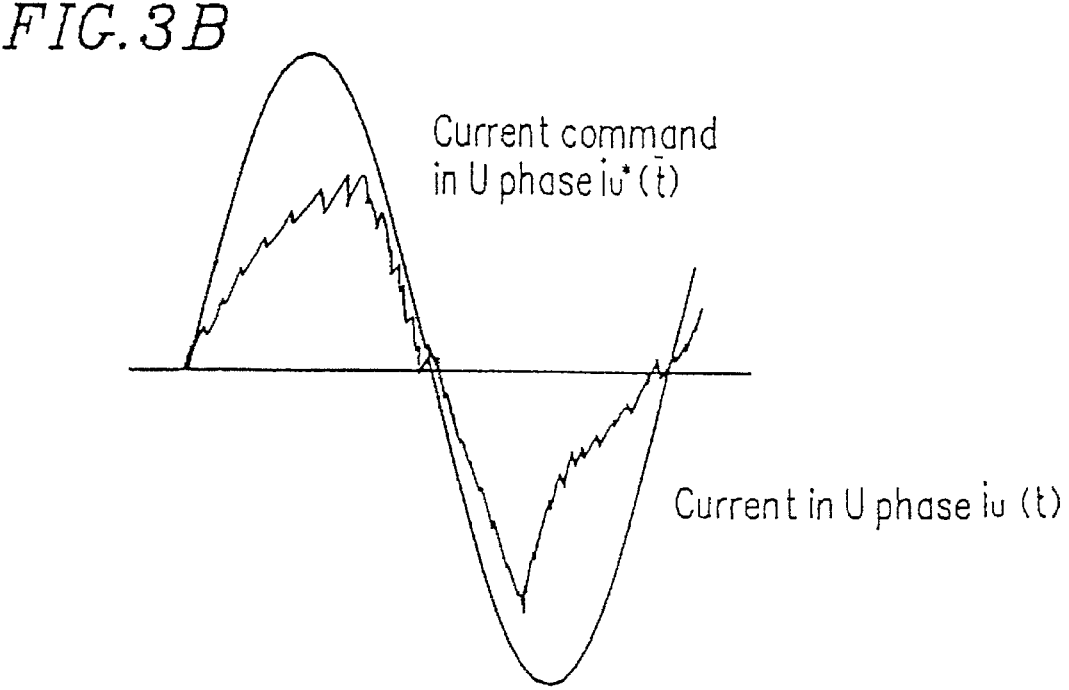

FIG. 3B shows the relationship between the current command value $i_u^*(t)$ in a U-phase and the detected current value $i_u(t)$ in a U-phase to be obtained when an inverter that will be described later is saturated.

Figure 3C:
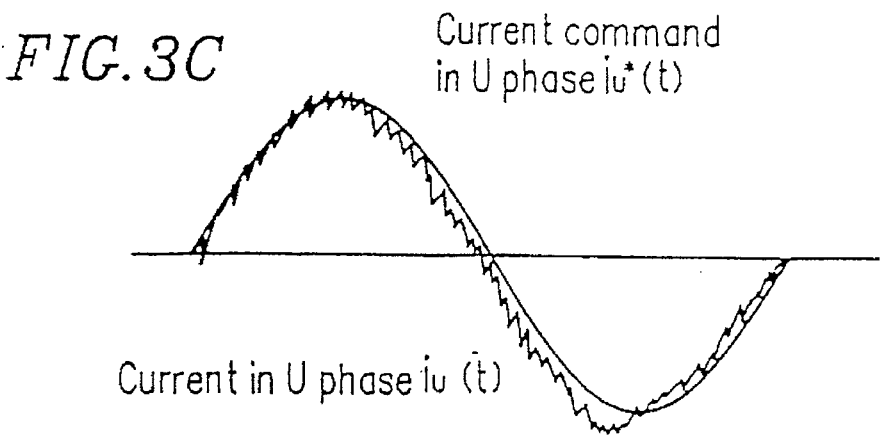
FIG. 3C shows an actual value of the phase current.

FIG. 3C shows the relationship between the current command value $i_u^*(t)$ in a U-phase and the detected current value $i_u(t)$ in a U-phase to be obtained when the inverter is not saturated.

In the case where the inverter is saturated, even if a current command section 136 outputs a current command signal, the inverter can not generate the commanded current, so that the commanded current is not supplied to the pair of terminals of the controller.

Next, the case where the inverter is saturated will be described with respect to the switching of the inverter.

Figure 4:
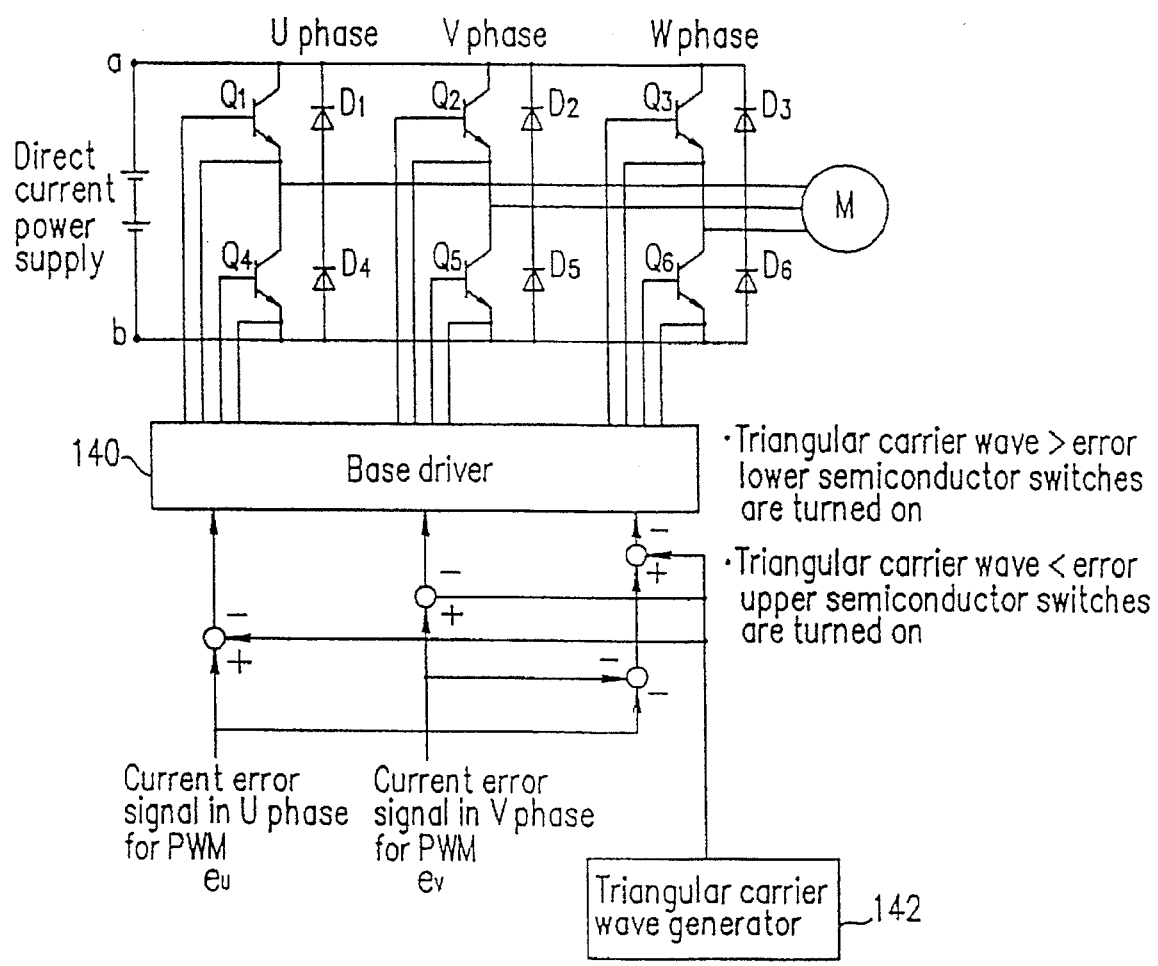
FIG. 4 is a detailed circuit diagram of a voltage application section.

FIG. 4 is an exemplary circuit diagram of the inverter included in the input application section 138. The inverter includes: semiconductor switches Q1 to Q6; diodes D1 to D6; a base driver 140 for controlling the ON/OFF states of the semiconductor switches Q1 to Q6; and a triangular carrier wave generator 142.

A current error $e_U(t)$ in a U-phase for the PWM, a current error $e_V(t)$ in a V-phase for the PWM, and a triangular carrier wave output from the triangular carrier wave generator 142 are input to the base driver 140. Based on a pulse width modulation signal to be obtained by comparing the respective current errors for the PWM with the carrier wave signal, the base driver 140 controls the ON/OFF states of the semiconductor switches Q1 to Q6 in the respective phases of the inverter. For example, if the current error $e_U(t)$ in the U-phase for the PWM is larger than the triangular carrier wave, then the base driver 140 turns on the semiconductor switch Q1 and turns off the semiconductor switch Q4. On the other hand, if the current error $e_U(t)$ in the U-phase for the PWM is smaller than the triangular carrier wave, then the base driver 140 turns on the semiconductor switch Q4 and turns off the semiconductor switch Q1. The base driver 140 operates in the same way with respect to the other phases.

The inverter generates the currents having the values of $i_U(t)$, $i_V(t)$ and $i_W(t)$ to be supplied to the stator of the synchronous motor 100 by using the current error $e_U(t)$ in the U-phase for the PWM and the current error $e_V(t)$ in the V-phase for the PWM. Alternatively, the currents having the values of $i_U(t)$, $i_V(t)$ and $i_W(t)$ may be generated by using a current error in any one of the U, V and W phases for the PWM. Moreover, the currents having the values of $i_U(t)$, $i_V(t)$ and $i_W(t)$ may be generated by using the current errors for the PWM in two phases selected arbitrarily from the three phases. Furthermore, the currents having the values of $i_U(t)$, $i_V(t)$ and $i_W(t)$ may be generated by using all the current errors for the PWM in the three phases.

FIGS. 5A, 5B and 5C show the variations of the current error signal for the PWM to be obtained in the case where the inverter is saturated and in the case where the inverter is not saturated, and the respective operational states of the semiconductor switches Q1 and Q4.

In the case where the ON/OFF operations are periodically concentrated during a half period, even if the switching is operated sufficiently in order to supply a commanded current to the stator of the synchronous motor 100, the commanded current can not be supplied so as to exceed the saturated amount. The saturation degree of the inverter may be defined by the amount of the current error for the PWM. For example, if the current error for the PWM is large, then the saturation degree of the inverter also becomes large. On the other hand, if the current error for the PWM is small, then the saturation degree of the inverter also becomes small.

In order to reduce the saturation degree of the inverter, a flux-weakening control for leading the phase of the current by supplying the D-axis current $i_d$ to the stator of the synchronous motor 100 can be performed in the following manner.

A current i(t) in any one of the three phases of the currents having the values of $i_U(t)$, $i_V(t)$ and $i_W(t)$ to be supplied actually to the synchronous motor 100 is detected by the current detection section 102. The detected current is input to the saturation degree output section 104. The saturation degree output section 104 subtracts the detected current $i_U(t)$, $i_V(t)$ or $i_W(t)$ from the command value i*(t) of the current in the corresponding phase calculated by the equations for deriving the current command values using the D-axis current $i_d$ and the Q-axis current $i_q$. The saturation degree output section 104 calculates an absolute value with respect to the result of the subtraction so as to integrate a current error e(t) resulting from the absolute value. The result of the integration is input to the judged value output section 106.

In this example, the saturation degree output section 104 integrates the absolute value of the error. Alternatively, the integrated value of the square of the error or the maximum value of the error may be input to the judged value output section 106.

Since the controller of the invention includes the current command section 136, the following advantages can be obtained.

The variation components become large, so that it is difficult to use the current error e(t) varying periodically for the subsequent processing without performing any operation thereto. Therefore, by integrating the current corresponding to one phase in the time domain, a direct current value showing the variation small enough to control the synchronous motor 100 can be obtained.

In theory, a value approximately equal to the direct current component can be calculated by using the current corresponding to the three phases. However, since the square values of the respective currents in the U, V and W phases are calculated and then added, the operation becomes complicated.

The judged value output section 106, as indicated by the following Equation 3, subtracts the reference $e_{ref}$ determined by the reference output section 108 from the integrated value of the current error e(t) so as to output the judged value $H_{an}$ resulting from the subtraction.

$$H_{an} = \int_{t-T/4}^{t+T/4} e(t)dt - e_{ref} \quad (3)$$

Herein, the reference output section 108 varies the reference $e_{ref}$ based on the integration time. More specifically, if the integration time of the current error e(t) is a half period T/2 of the current error e(t), then the reference output section 108 outputs a reference value $e_{ref}$ based on the calculation result of the following Equation 4. The reference $e_{ref}$ may also be obtained based on the calculation result of the following Equation 5 using the speed ω. In this example, the half period of the current error e(t) is used as the integration time. However, the integration time can be of an arbitrary length. Nevertheless, since the current error e(t) changes periodically, the length of the integration time is preferably N (an integer) times as long as the half period.

$$e_{ref} = \text{constant value} \cdot T/2 \quad (4)$$

$$e_{ref} = \text{constant value}/\omega \quad (5)$$

Herein, if the judged value $H_{an}$ is large, then the current error is also large. In other words, the Q-axis current to be actually supplied to the synchronous motor 100 does not follow up the Q-axis current command value. Therefore, since the voltage margin is small in the high-speed rotation region of the synchronous motor 100, a Q-axis current for generating a torque suitable for the rotation speed can not flow in the case where the synchronous motor 100 operates in the dynamic mode. On the other hand, in the case where the synchronous motor 100 operates in the regenerative mode, an excessive amount of Q-axis current for generating a torque suitable for the rotation speed flow. Under such a condition where the voltage margin is small, it is necessary to increase the D-axis current $i_d$ in order to obtain a rotation speed or a torque to be commanded and output.

When the synchronous motor 100 operates in the dynamic mode, the judged value becomes large. Therefore, in the dynamic operational mode, even if the semiconductor switches Q1 to Q6, i.e., the components of the input application section 138 shown in FIG. 1, of the driver are turned into a conductive state in order to supply a current to the synchronous motor 100, the necessary amount of current does not flow.

On the other hand, if the judged value $H_{an}$ is small, then the current error is naturally small. This fact indicates that the current to be actually supplied to the synchronous motor 100 satisfactorily follows up the current command value. In the case where the judged value $H_{an}$ is small and the synchronous motor 100 operates in the dynamic mode, it becomes possible to supply a Q-axis current $i_q$ in the amount equal to or larger than the amount of the Q-axis current $i_q$ currently flowing through the synchronous motor 100 and to increase the rotation speed of the synchronous motor 100 without varying the amount of the D-axis current $i_d$ currently flowing through the synchronous motor 100.

In both cases where the synchronous motor 100 operates in the dynamic mode and in the regenerative mode, the amount of the D-axis current tends to be excessive. In view of the reduction of the loss, it is preferable to reduce the amount of the D-axis current $i_d$. In the case where it is not especially necessary to supply the D-axis current $i_d$, the amount of the D-axis current $i_d$ may be zero in the non-salient pole motor.

The judged value $H_{an}$ shows the degree of the realization of the command of the current to be actually supplied to the synchronous motor 100. If the current command can be realized, then it is sufficient to increase the D-axis current $i_d$. When the current command is actually realized, it is sufficient to decrease the D-axis current $i_d$ by maintaining the current rotation speed and the current torque condition in order to maximize the efficiency of the sychronous motor 100.

Following the above-described principles, the D-axis current command section 110 varies the amount of the D-axis current based on the output from the judged value output section 106. For example, if $H_{an}>0$, then the D-axis current command section 110 increases or holds the previous command value $i_d^*$ of the D-axis current. The previous command value $i_d^*$ of the D-axis current is held when the command value $i_d^*$ of the D-axis current reaches the predetermined maximum value $i_d^*_{max}$.

On the other hand, if $H_{an}<0$, then the D-axis current command section 110 decreases or holds the previous command value $i_d^*$ of the D-axis current. The previous command value $i_d^*$ of the D-axis current is held when the command value $i_d^*$ of the D-axis current reaches the predetermined minimum value $i_d^*_{min}$.

In general, a non-salient pole motor uses a command value $i_d^*$ of zero or a value in a slightly lead phase because of some increment of the command value $i_d^*$ as the minimum value $i_d^*_{min}$. In the former case, i.e., $i_d^*=0$, a non-salient pole motor generally exhibits the highest efficiency. However, in the case where the iron loss of a non-salient pole motor is large, the iron loss can be reduced by performing a flux-weakening control to a small degree by slightly leading the phase so as to reduce the stator magnetic flux. As a result, a balance can be established between the iron loss and the copper loss, thereby maximizing the efficiency.

On the other hand, an inverse salient-pole motor also uses a reluctance torque, to a certain degree the phase is lead beforehand, i.e., in the range of 10° to 40° in order to generate the reluctance torque. In the regions other than the flux-weakening controlled region, the minimum value $i_d^*_{min}$ of the commanded value $i_d^*$ of the D-axis current can be obtained by the following equation (herein, the fixed phase lead amount is assumed to be 30°), as will be described in detail later. That is, $i_d^*_{min} = i^* \cdot \sin 30°$. More specifically, in performing a flux-weakening control, the calculation is conducted based on the following Equations 6.

In the case where $H_{an}>0$ and $i_d^*<i_d^*_{max}$, $$i_d^*(i) = i_d^*(i-1) + K_1 \cdot H_{an} \leq i_{d\,max}, \text{ where } K_1>0$$

In the case where $H_{an}>0$ and $i_d^* = i_d^*_{max}$, $$i_d^*(i) = i_d^*(i-1)$$

In the case where $H_{an}<0$ and $i_d^* > i_d^*_{min}$, $$i_d^*_{min} \leq i_d^*(i) = i_d^*(i-1) + K_2 \cdot H_{an}, \text{ where } K_2>0$$

In the case where $H_{an}<0$ and $i_d^* = i_d^*_{min}$, $$i_d^*(i) = i_d^*(i-1) \quad (6)$$

where, $i_d^*(i)$ and $i_d^*(i-1)$ respectively indicate the present and previous command values $i_d^*$ of the D-axis current.

The control operation including the integration operations expressed by the above equations will now be described in further detail.

If $H_{an}>0$, then the D-axis current command section 110 increases the command value $i_d^*$ of the D-axis current by $K_1 \cdot H_{an}$ every time the command section 110 performs the control operation. Such an operation can be performed by the integration operation. By performing the operation, it is possible to set $H_{an}$ to be zero.

If the command value $i_d^*$ of the D-axis current is equal to $i_d^*{}_{max}$, then the D-axis current command section 110 fixes the command value $i_d^*$ of the D-axis current at $i_d^*{}_{max}$. When $H_{an}$ becomes equal to zero, the D-axis current command section 110 continues to supply a constant command value $i_d^*$ of the D-axis current if the loaded torque is constant.

Next, when $H_{an}$ becomes smaller than zero because of the decrease in the loaded torque or the rotation speed, the D-axis current command section 110 starts to reduce the command value $i_d^*$ of the D-axis current. Then, when a balance is established in the synchronous motor 100 and $H_{an}$ becomes equal to zero, the D-axis current command section 110 stops reducing the command value $i_d^*$ of the D-axis current and supplies a constant command value $i_d^*$ of the D-axis current to the synthesized current section 136. When the rotation speed is reduced to the region where the flux-weakening control is no longer necessary, the D-axis current command section 110 supplies the above-mentioned minimum value $i_d^*{}_{min}$ to the synthesized current section 136. In order to set the command value $i_d^*$ of the D-axis current to be equal to or smaller than the minimum value $i_d^*{}_{min}$ even if $H_{an}$ is smaller than zero, the D-axis current command section 110 does not reduce the command value $i_d^*$ of the D-axis current.

Subsequently, the Q-axis current command section 130 calculates the command value $i_q^*$ of the Q-axis current by using the error between the command speed $\omega^*$ for commanding the rotation speed of the synchronous motor 100 and the actual speed $\omega$ of the synchronous motor 100 and a constant K in accordance with the following Equation 7.

$$i_q^* = K \cdot (\omega^* - \omega) \tag{7}$$

Needless to say, the command value $i_q^*$ of the Q-axis current can be commanded without regard to the command speed $\omega^*$.

Then, a vector is calculated from the command value $i_d^*$ of the D-axis current and the command value $i_q^*$ of the Q-axis current by the current command section 136 in accordance with the following Equations 8. As the result of the vector operation, the level of the command signal of the synthesized current to be supplied to the synchronous motor 100 and the phase $\theta$ of the command signal are output.

$$I^* = (i_d^{*2} + i_q^{*2})^{1/2}$$
$$\theta = -\tan^{-1}(i_q^*/i_d^*) \tag{8}$$

Herein, in the case where the synthesized current value $I^*$ becomes equal to or larger than the predetermined maximum current value $i_{max}$, $i_d^*$ has a priority and $i_q^*$ is obtained by the following Equation 9.

$$i_q^* = (i_{max}^2 - i_d^{*2})^{1/2} \tag{9}$$

Herein, by setting $i_{max}$ to be equal to $i_d^*{}_{max}$, in the case where the synchronous motor 100 operates in the dynamic mode, the current command section 136 continues to increase the command value $i_d^*$ of the D-axis current until the integrated value of the current error reaches the reference value, even when the supplied command value $i_q^*$ of the Q-axis current is an excessive torque current larger than $i_{max}$. As a result, the commanded value $i_q^*$ of the Q-axis current continues to decrease so as to correspond to the increment of the command value $i_d^*$ of the D-axis current.

In other words, the balance between the command value $i_d^*$ of the D-axis current and the command value $i_q^*$ of the Q-axis current is being adjusted in order to maximize the output of the synchronous motor 100. That is to say, when the maximum current is supplied to the synchronous motor 100, a maximum torque is realized.

Next, the input application section 138 performs an operation to supply a current based on the command value actually synthesized with the synchronous motor 100 using the equations for deriving the current command values. Based on the equations for deriving the current commands ($i_u^*(t)$, $i_v^*(t)$, and $i_w^*(t)$), the command value $i_d^*$ of the D-axis current and the command value $i_q^*$ of the Q-axis current, the input application section 138 outputs three current command values in the three phases U, V and w which are different from each other by 120 degrees in accordance with an equation for converting two phases into three phases. Then, the saturation degree output section 104 compares the current error e(t) for the PWM with a triangular carrier wave signal of about 10 kHz. Based on the pulse width modulation signal resulting from the comparison, the semiconductor switches Q1 to Q6 in the respective phases are controlled, thereby supplying the commanded current to the synchronous motor 100.

The judged value output section 106 subtracts the reference value $e_{ref}$ from the integrated value of the current error e(t), so as to output the judged value $H_{an}$ resulting from the subtraction. If $H_{an} > 0$, then the D-axis current command section 110 increases or holds the command value $i_d^*$ of the D-axis current. On the other hand, if $H_{an} < 0$, then the D-axis current command section 110 decreases or holds the command value $i_d^*$ of the D-axis current.

That is to say, when the judged value $H_{an}$ is large, the commanded output is not obtained. Accordingly, the Q-axis current is supplied by adding $i_d$ in an indispensable amount, so as to output the commanded rotation speed and the commanded torque. To the contrary, when the judged value $H_{an}$ is small, the commanded output can be obtained even if the D-axis current $i_d$ is reduced a little. Accordingly, the D-axis current command section 110 decreases the D-axis current $i_d$, thereby improving the efficiency. As a result, the amount of the D-axis current $i_d$ is automatically optimized in view of the efficiency, so that the flux-weakening control of the synchronous motor 100 is realized with a high efficiency.

In this example, a non-salient pole rotor as shown in FIG. 6A has been described. In the case of using a salient-pole rotor or an inverse salient-pole rotor as shown in FIG. 6B, the D-axis current $i_d$ corresponding to the reluctance torque (that will be described later) is required to be added to or subtracted from the D-axis current $i_d$ for the flux-weakening control.

As described above, the D-axis current command section 110 performs a control using the integration operation as expressed by Equations 6. Needless to say, in the case where the D-axis current command section 110 performs a proportional integral and differential (PID) control as expressed by the following Equation 10, the same effects can be obtained.

$$i_d^*(i) = i_d^*(i-1) + K_a \cdot H_{an}(i) + K_b \cdot H_{an}(i-1) + K_c \cdot H_{an}(i-2) \tag{10}$$

where $K_a$, $K_b$ and $K_c$ are constants.

In addition, in the case of employing other control methods such as a fuzzy control in which a non-linear gain can be used, or an adaptive control, the command value $i_d^*$ of the D-axis current can be obtained only if an operation corresponding to the integration is included in the method.

Moreover, the saturation degree output section 104 can detect the saturation degree of the inverter by measuring an open period or a closed period of the semiconductor switches Q1 to Q6 in the respective phases with respect to the half period of the current command signal.

In this example, the saturation degree of a current in one phase of the currents in the three phases $i_u(t)$, $i_v(t)$ and $i_w(t)$ is calculated. In addition, the current detection section 102 may detect the current in two or three phases of the currents in the three phases $i_u(t)$, $i_v(t)$ and $i_w(t)$, and the saturation degree output section 104 may calculate an average value of the saturation degrees in the two or three phases.

The precision for controlling the synchronous motor 100 and the efficiency of the synchronous motor 100 are improved by using an average value of the saturation degrees in two or three phases.

It is noted that in the case where the period of the reference value $e_{ref}$ of the error output from the reference output section 108 is synchronized with the period of an encoder detection signal, or the like, the reference value $e_{ref}$ is varied in accordance with the period and the rotation speed as expressed by Equation 4 or 5.

Herein, it is to be noted that in the case of detecting the current flowing through the synchronous motor 100 at a constant period without regard to the rotation speed of the synchronous motor 100, the integrated value of the error is varied based on the detection timings.

In this first example, the judged value $H_{an}$ obtained by the judged value output section 106 is input to the D-axis current command section 110. Alternatively, the same effects as those obtained in this example can be attained by calculating the judged value $H_{an}$ by using the Q-axis current. In order to calculate the judged value $H_{an}$ by using the Q-axis current, the following processing different from that of this first example is taken. The command value $i_q^*$ output from the Q-axis current command section 130 is input to the saturation degree output section 104 (not shown). The current component $i_q$ to be obtained in the following manner is also input to the saturation degree output section 104.

The respective values $i_u$, $i_v$ and $i_w$ of the currents in the three phases to be actually supplied to the synchronous motor 100 are detected by the current detection section 102. In the case where the values of the currents in the two phases are detected, the current in the remaining one phase is obtained by using the relationship expressed by an equation $i_u + i_v + i_w = 0$. Then, the current component $i_q$ expressed by the D-Q axis representing the rotation coordinates is calculated by using the following Equation 11 (it is not necessary to calculate $i_d$).

$$i_d = -(2/3)^{1/2}\{i_U \cdot \cos\omega t + i_V \cdot \cos(\theta - 2\pi/3) + i_W \cdot \cos(\theta + 2\pi/3)\} \quad (11)$$
$$i_q = -(2/3)^{1/2}\{i_U \cdot \sin\omega t + i_V \cdot \sin(\theta - 2\pi/3) + i_W \cdot \sin(\theta + 2\pi/3)\}$$

The saturation degree output section 104 subtracts the detected current value $i_q$ from the command value $i_q^*$ of the Q-axis current. The value to be obtained by integrating the current error e resulting from the subtraction is compared with the reference value $e_{ref}$ so that the judged value $H_{an}$ resulting from the comparison is output.

In this case, though the configuration of the saturation degree output section 104 becomes complicated, the saturation degree output section 104 directly controls the necessary torque current $i_q$, so that the torque of the synchronous motor 100 can be controlled with an even higher precision.

If the circuit for precisely separating the Q-axis current components from the current flowing through the synchronous motor 100 is an analog circuit, then the configuration of the analog circuit becomes complicated. Therefore, in order to precisely separate the Q-axis current components from the current flowing through the synchronous motor 100, a digital circuit is preferably used. Accordingly, the operation for calculating the feedback control signal is preferably digitized by using a D-axis current command section 110 or a Q-axis current command section 130, a current command section 136, a saturation degree output section 104 and a judged value output section 106.

In addition, the saturation degree output section 104 of this first example may have the following configuration. First, it will be described the case where the saturation degree output section 104 detects the saturation degree of the inverter based on the value obtained by integrating the difference between the command value in one phase and the value of the current actually flowing through the synchronous motor 100 during a half period of the current error. If the operational voltage of the synchronous motor 100 is lowered, then the rotation speed of the synchronous motor 100 becomes small and the half period of the current error becomes longer. As a result, the integration time becomes longer and the integrated value becomes larger. When the integrated value exceeds the maximum output value from an A/D converter, the integrated value is limited by the maximum output value of the A/D converter. In such a case, it is desirable to reduce the gain of an integrator (not shown) of the saturation degree output section 104 in order to set the integrated value to be smaller than the maximum output value of the A/D converter (not shown). The variation of the set gain of the integrator in this way is very effective in the case where the synchronous motor 100 is operated at a low rotation speed. For example, by switching the gain using switches (not shown) or by varying the gain using a variable resistance, the integrated value is no longer limited by the maximum output value of an A/D converter. As a result, the controller becomes applicable to a wider range.

Moreover, the current detection section 102 of the first example can be replaced by a torque detection section (not shown) for measuring the torque of the synchronous motor 100. In such a case, the current command section calculates the command torque to be supplied to the synchronous motor 100 from the command value of the D-axis current and the command value of the Q-axis current, thereby outputting the command torque. The saturation degree output section 104 may subtract the measured torque from the command torque, so as to output the result of the subtraction as the saturation degree. The D-axis current can also be controlled by using the above-described configuration in this first example.

Furthermore, the saturation degree output section 104 of this first example may also have the following configuration. The saturation degree output section 104 detects the saturation degree of the inverter based on the difference between the integrated current value obtained by integrating the command value i*(t) of a current in at least one phase and the corresponding detected value i(t) obtained by detecting the current actually flowing through the synchronous motor 100. As a result, it becomes possible to eliminate the error caused by the phase difference among the respective signals, thereby precisely controlling the current actually flowing through the synchronous motor 100.

In addition, the D-axis current command section 110 of this first example may have the following configuration. In the case where the rotation speed is equal to or smaller than the predetermined rotation speed, then the D-axis current command section 110 holds the command value of the D-axis current at a predetermined minimum value $i_d^*{}_{min}$. Until the rotation speed becomes large, the command value of the D-axis current is held at a constant value. As a result, the output torque of the synchronous motor 100 is suppressed, and therefore the speed response characteristics of the synchronous motor 100 is sacrificed. However, it becomes possible to provide a highly efficient controller for a synchronous motor.

Moreover, as expressed by Equations 6, the command value of the D-axis current is held between a predetermined upper limit value and a predetermined lower limit value as expressed by Equations 6. Particularly, in the case where the upper limit value is small, the response characteristics are sacrificed in the same way. However, it is also possible to provide a highly efficient controller for a synchronous motor.

In addition, the reference output section 108 may vary the reference value based on at least one of the rotation speed and the current command value (this configuration is not shown). By using such a configuration, the following effects can be obtained. If the rotation speed of the synchronous motor becomes large, then the iron loss becomes excessively larger as compared with the copper loss. In order to compensate for this imbalance, the D-axis current $i_d$ is increased so as to perform the flux-weakening control. As a result, the magnetic flux becomes smaller and the iron loss is reduced, so that a balance is established between the copper loss (proportional to the square of the current) and the iron loss. Consequently, the efficiency of the controller can be further improved. In this case, since the increase in the rotation speed lowers the reference value, it is effective to perform the flux-weakening control.

EXAMPLE 2

Hereinafter, a controller for a permanent magnet synchronous motor 100 according to a second example of the invention will be described with reference to the drawings. The controller according to this second example makes it possible to adjust the D-axis current $i_d$ so as to maximize the efficiency by forcibly varying the D-axis current $i_d$.

Figure 7:
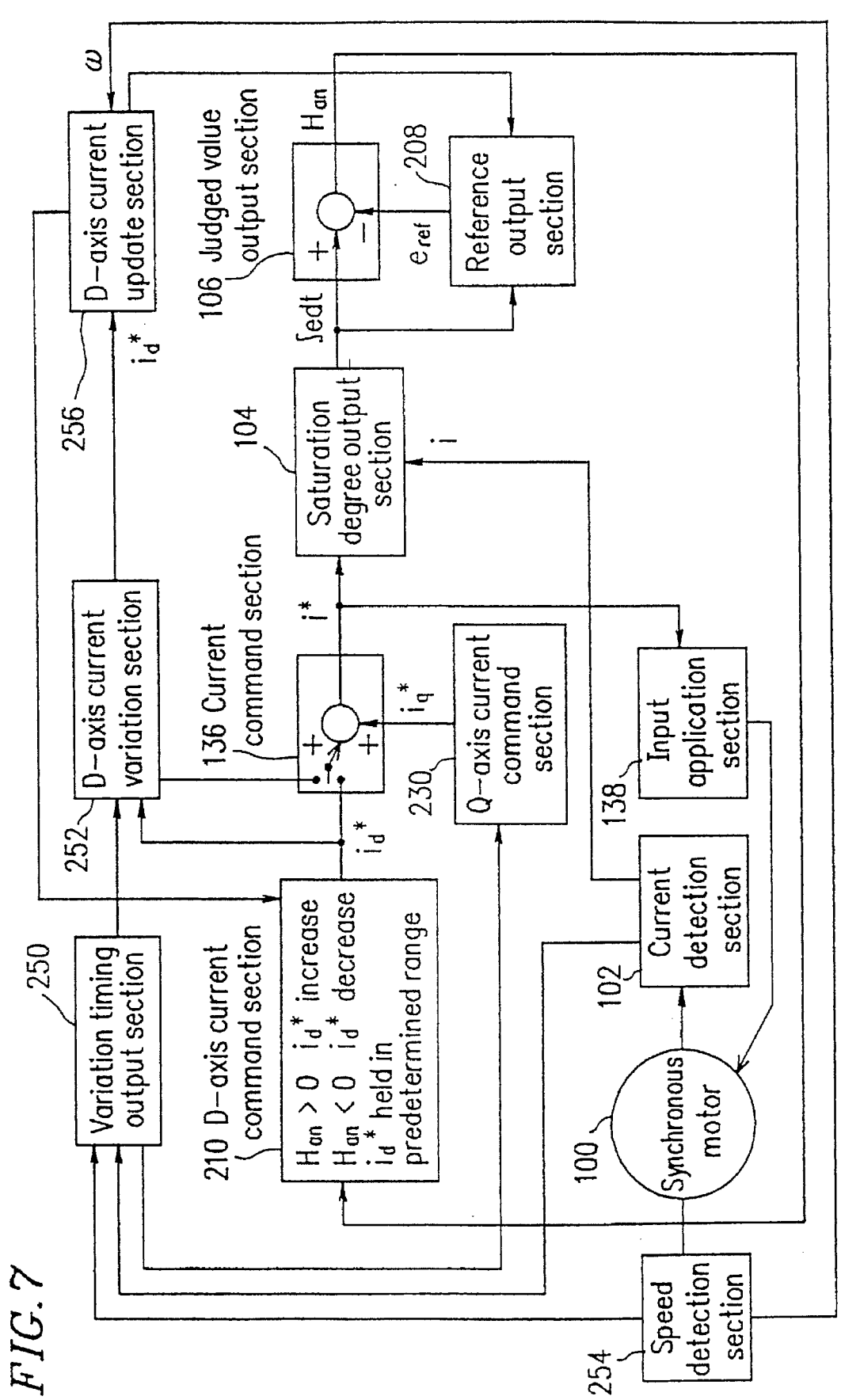
FIG. 7 is a block diagram showing the configuration of a controller for a permanent magnet synchronous motor according to a second example of the invention.

FIG. 7 is a block diagram showing the entire configuration of a controller for a permanent magnet synchronous motor 100 according to the second example of the invention. The controller of this second example further includes: a variation timing output section 250; a D-axis current variation section 252; a speed detection section 254; and a D-axis current update section 256, as well as all the components of the controller of the first example. Moreover, a reference output section 208, a D-axis current command section 210, and a Q-axis current command section 230 are different from the reference output section 108, the D-axis current command section 110, and the Q-axis current command section 130 of the first example, respectively. The same components as those of the first example will be denoted by the same reference numerals and the description thereof will be omitted herein.

Referring to FIG. 7, the operation of the controller for a permanent magnet synchronous motor 100 will be described in detail below.

In the case where the synchronous motor 100 is judged to be in a stationary state based on the rotation speed of the synchronous motor 100 to be detected by the speed detection section 254 and the D-axis current, the variation timing output section 250 outputs a variation timing for forcibly varying the D-axis current to the D-axis current variation section 252 and the Q-axis current command section 230. The stationary state herein refers to the state where the rotation speed and the D-axis current are within a certain range during a predetermined period. The D-axis current is detected by the current detection section 102.

Next, in the case where the Q-axis current command section 230 and the D-axis current variation section 252 receive the command from the variation timing output section 250, the D-axis current is being reduced while the synthesized current is held at a constant value so as to satisfy the following Equation 12. In the case where the D-axis current $i_d$ and the Q-axis current $i_q$ are sine waves, reducing the D-axis current while holding the synthesized current at a constant value is equivalent to varying the phase of the command value of the synthesized current. If the ratio of the D-axis current $i_d$ becomes large, then the current phase is lead.

$$I^*=(i_d^{*2}+i_q^{*2})^{1/2} \tag{12}$$

For example, when $i_q^*=10$ A and $i_d^*=6$ A ($I^*=11.66$ A), if the variation timing output section 250 judges the synchronous motor 100 to be in a stationary state, then the Q-axis current command section 230 and the D-axis current variation section 252 vary these two values into the following values: $i_q^*=10.12$ A and $i_d^*=5.8$ A ($I^*=11.66$ A).

Next, the case where the speed detection section 254 has already detected the rotation speed in the stationary state will be described. The speed detection section 254 detects a rotation speed after the D-axis current $i_d$ has been varied. The D-axis current update section 256 compares the rotation speeds before and after the D-axis current $i_d$ has been varied. In the case where the rotation speed increases after the D-axis current $i_d$ has been varied, the command value of the D-axis current $i_d$ is updated into the value of the D-axis current after the D-axis current $i_d$ has been varied. This is because an excessive amount of D-axis current $i_d$ is supplied to the synchronous motor 100 in such a state (where the rotation speed has increased), and therefore the efficiency becomes degraded. It is noted that the D-axis current update section 256 receives the command value $i_d^*$ of the D-axis current through the D-axis current variation section 252.

On the other hand, in the case where the rotation speed decreases after the D-axis current $i_d$ has been varied, the current command section 136 uses the value of the D-axis current before the D-axis current $i_d$ has been varied as the command value of the D-axis current $i_d$. In the case where the command value of the D-axis current $i_d$ has been updated, it is necessary to continuously determine whether the updated command value of the D-axis current $i_d$ is an optimal value or not. In the same way, even in the case where the rotation speed decreases after the D-axis current $i_d$ has been varied for the first time, it is necessary to determine whether the rotation speed increases or not by the increase in the D-axis current $i_d$.

If the rotation speed increases, then the D-axis current $i_d$ continues to be varied. That is to say, the value of the D-axis current $i_d$ is required to be continuously varied until the value of the D-axis current $i_d$ becomes an optimal one. During this variation operation, the switch of the current command section 136 connects the current command section 136 to the D-axis current variation section 252 as shown in FIG. 7.

On the other hand, when an external torque command or the like for increasing the D-axis current $i_d$ is not given, the variation timing output section 250 continuously supplies a permission for varying the D-axis current $i_d$ to the D-axis current variation section 252. In such a case, the D-axis current is updated repeatedly.

In the case where the time delay since the D-axis current $i_d$ is varied until the rotation speed of the synchronous motor 100 has been sufficiently varied is relatively long, the rotation speed of the synchronous motor 100 may be judged by the D-axis current update section 256 after a certain time period (longer than the time delay) has passed since the D-axis current $i_d$ is varied. By performing the above-mentioned operation, the D-axis current update section 256 can obtain and output an optimal command value $i_d^*$ of the D-axis current.

Herein, in the case where the variation timing output section 250 judges the synchronous motor 100 to be in a stationary state, and the judged value output from the judged value output section 106 is a positive value, the reference output section 208 outputs a new reference value based on this command value $i_d^*$ of the updated D-axis current. In other words, in the case where the command value $i_d^*$ of the D-axis current decreases, the reference output section 208 increases the reference value in accordance with the amount of the decrease. On the contrary, in the case where the command value $i_d^*$ of the D-axis current increases, the reference output section 208 decreases the reference value so as to be proportional to the increment. It is noted that the reference output section 108 receives a signal indicating the state of the synchronous motor 100 through the D-axis current variation section 252 and the D-axis current update section 256.

Next, the case where the judged value output from the judged value output section 106 is a negative value will be described. In the case of using an non-salient pole rotor, the value of the D-axis current $i_d$ may be either zero or a predetermined value, as described above. However, in the case of using an inverse salient-pole motor, since the reluctance torque of the second term in the following Equation 13 can be used in the regions other than the flux-weakening region, the D-axis current $i_d$ can be supplied.

$$T = \Psi \cdot i_q + (L_q - L_d) \cdot i_d \cdot i_q \tag{13}$$

The case where the D-axis current update section 256 operates in an ordinary region, not in the flux-weakening region based on the varied command value $i_d$ the D-axis current, so as to vary the coefficient in Equation 14 will be described. In the case where the command value $i_d^*$ of the D-axis current increases, the coefficient K in Equation 14 is increased, while in the case where the command value $i_d^*$ of the D-axis current decreases, the constant K in Equation 14 is decreased. The actual control operation in that case will be described. The D-axis current command section 210 calculates the command value I* of the synthesized current. The Q-axis current command section receives the calculated command value I* of the synthesized current and the command value $i_d^*$ of the D-axis current (not shown). The Q-axis current command section calculates the command value $i_q^*$ of the Q-axis current based on the calculated command value I* of the synthesized current and the command value $i_d^*$ of the D-axis current by using Equation 8. It is noted that the rotation speed and the torque of the synchronous motor are varied by varying the constant value K.

Figure 14:
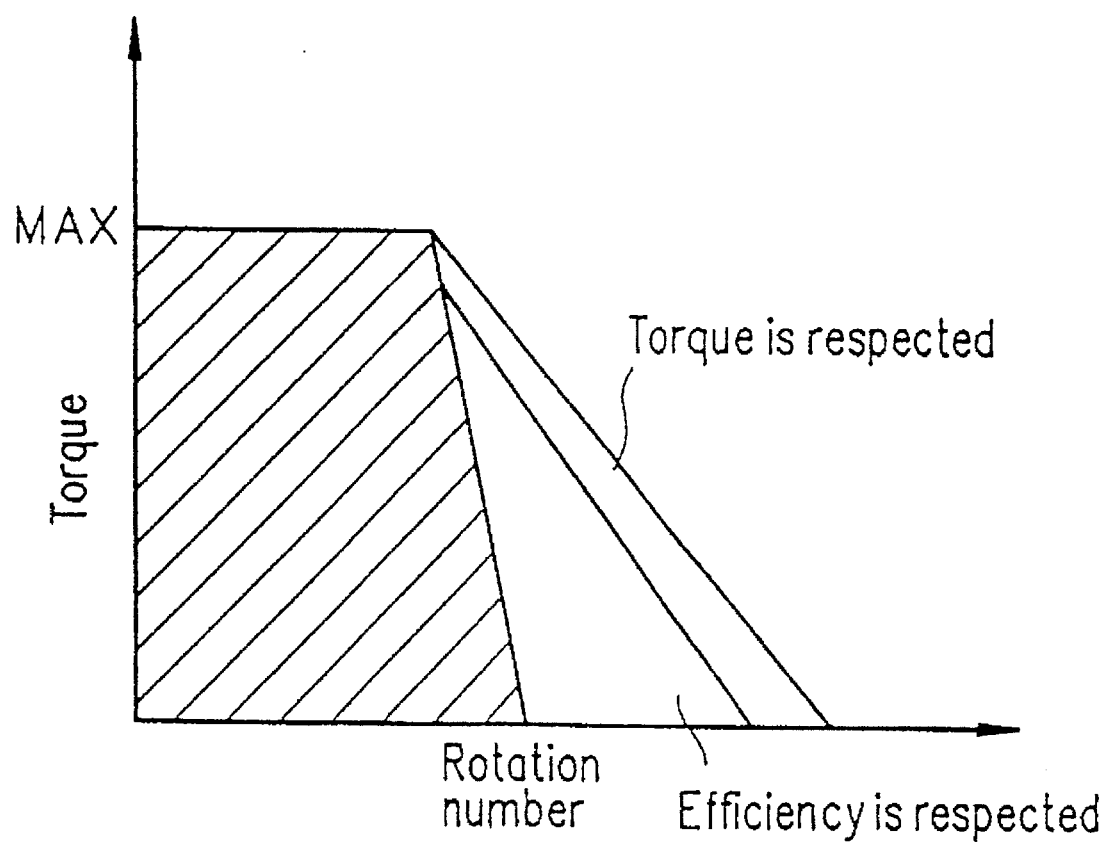
FIG. 14 is a graph showing the two regions inside the flux-weakening region where an efficiency and a torque are respected, respectively, to be automatically selected.

Herein, the ordinary region is a region indicated by the hatched lines in FIG. 14, and the region other than the region indicated by the hatched lines in FIG. 14 is a region newly generated by performing the flux-weakening control.

$$i_d^* = K \cdot I^* \tag{14}$$

Since the remaining operation is the same as that of the first example, the description thereof will be omitted herein.

As described above, by additionally providing a section for optimizing the D-axis current $i_d$ after determining whether the synchronous motor 100 is in a stationary state or not, it is possible to realize a controller which can operate with a high efficiency under the temporal or environmental variations.

In the case where the D-axis current $i_d$ in the ordinary region is varied, it is desirable for an inverse salient-pole motor to have a commonly used torque. In addition, it is desirable that the variation timing output section 250 also has the same feature. This is because the variation of the D-axis current $i_d$ at an operation point which is not used so frequently is meaningless.

Since the value of the D-axis current $i_d$ is not varied so much from the predetermined value in the vicinity of zero in the ordinary region of a non-salient pole motor, it is not necessary to vary the D-axis current $i_d$. Accordingly, the variation timing output section 250 does not output the variation timing in the ordinary region.

Also, the minimum value of the D-axis current $i_d$ is a value of the D-axis current $i_d$ to be obtained when the flux-weakening control is not performed. Thus, in an inverse salient-pole motor, the minimum value is not zero.

EXAMPLE 3

Hereinafter, a controller for a permanent magnet synchronous motor 100 according to a third example of the invention will be described with reference to the drawings. The controller according to the third example of the invention makes it possible to improve the response characteristics by using an initial value of the D-axis current $i_d$ set by a table or the like.

Figure 8:
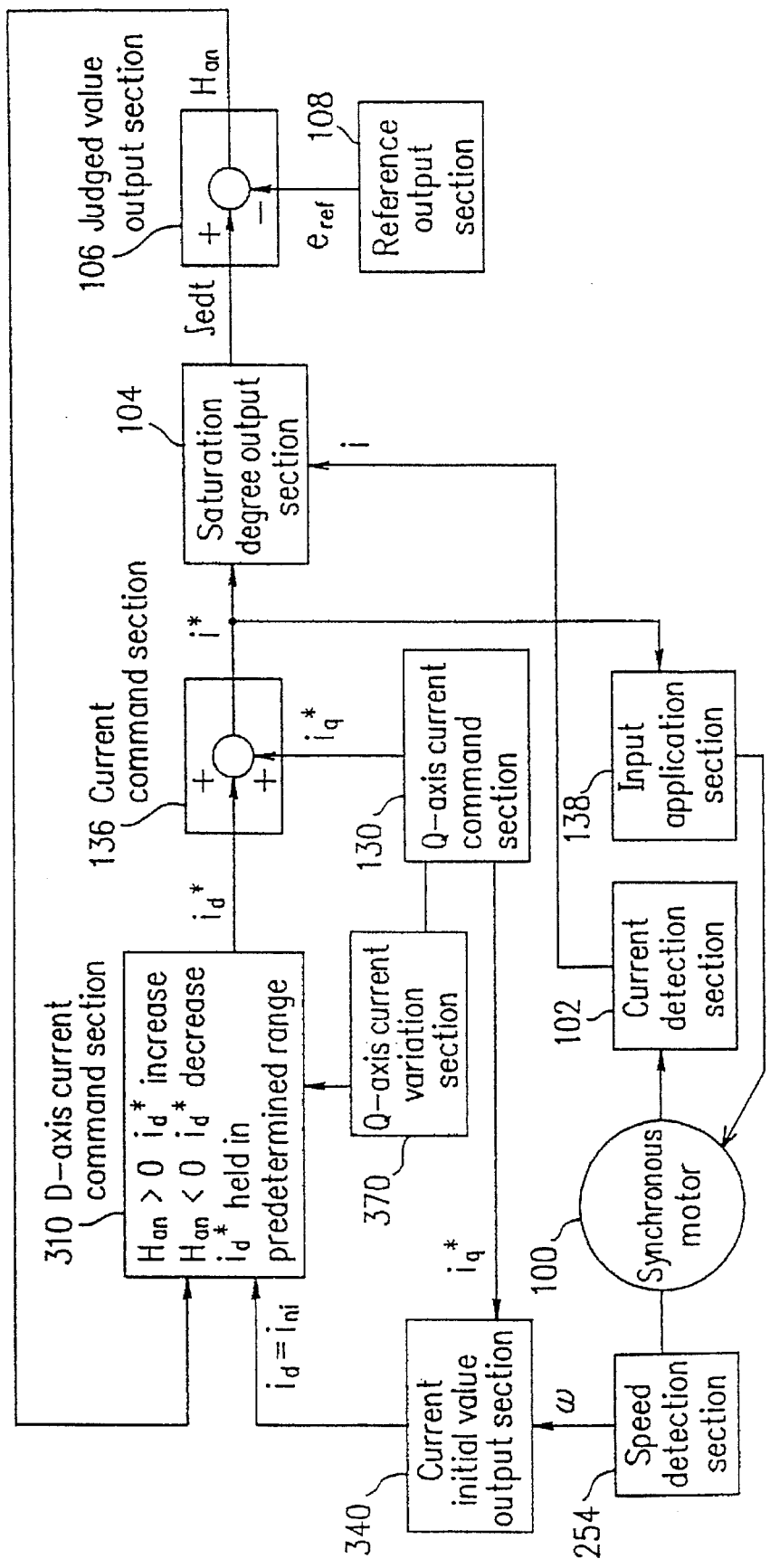
FIG. 8 is a block diagram showing the configuration of a controller for a permanent magnet synchronous motor according to a third example of the invention.

FIG. 8 is a block diagram showing the entire configuration of a controller for a permanent magnet synchronous motor 100 according to the third example of the invention. The controller of this third example further includes: a current initial value output section 340; a speed detection section 254; and a Q-axis current variation section 370, as well as all the components of the controller of the first example. Moreover, a D-axis current command section 310 is different from the D-axis current command section 110 of the first example. The same components as those of the first example will be denoted by the same reference numerals and the description thereof will be omitted herein.

Referring to FIG. 8, the operation of the controller for a permanent magnet synchronous motor 100 will be described in detail below.

In the case where the command value of the Q-axis current externally input is larger than the predetermined value, the current initial value output section 340 outputs an initial value $i_d^*_{ini}$ of the command value of the D-axis current corresponding to the command value of the Q-axis current externally supplied and the rotation speed output from the speed detection section 254. The initial value is obtained beforehand by a table or the like.

Herein, the current initial value output section 340 outputs the rotation speed detected by the speed detection section 254 and the D-axis current $i_d$ calculated from the torque in accordance with Equation 2.

In order to calculate the D-axis current $i_d$, it is possible to use a value calculated at real time based on an equation such as Equation 2, or a value obtained by actually performing an experiment based on the various data such as a terminal voltage and a temperature.

The D-axis current command section 310 uses the value output from the current initial value output section 340 as an initial value of the D-axis current value. In the same way as the D-axis current command section 110 of the first example, the D-axis current command section 310 increases or holds the D-axis current if the judged value is a positive one. On the other hand, if the judged value is a negative one, the D-axis current command section 310 decreases or holds the D-axis current.

By using an initial value $i_d*_{ini}$ of the D-axis current $i_d$ predetermined by a table or the like, the amount of time required for converging a D-axis current into the D-axis current having an optimal value for operating the synchronous motor 100 can be shortened.

In addition, it is also possible to shorten the time required for realizing the indispensable command value $i_q*$ of the Q-axis current. As a result, a controller for a permanent magnet synchronous motor 100 having improved response characteristics can be provided.

The Q-axis current variation section 370 receives the command value of the Q-axis current output from the Q-axis current command section, and holds a command value of the Q-axis current which was commanded at least two times before. By setting the variation amount of the command value of the Q-axis current externally input to be low and by using the variation amount of the Q-axis current $\{i_q*(i-1) - i_q*(i-2)\}$ when $H_{an} > 0$, the D-axis current command section 310 calculates the D-axis current by the following equation.

$$i_d*(i) = i_d*(i-1) + K \cdot H_{an} + K_q \cdot \{i_q*(i-1) - i_q*(i-2)\}$$

By using the variation amount of $i_q*$, the response characteristics are improved because the D-axis current $i_d*$ can be given.

EXAMPLE 4

Hereinafter, a controller for a permanent magnet synchronous motor 100 according to a fourth example of the invention will be described with reference to the drawings. In this fourth example of the invention, the changing ratio of the D-axis current $i_d$ when the synchronous motor 100 operates in the regenerative mode is set to be larger than the changing ratio of the D-axis current $i_d$ when the synchronous motor 100 operates in the dynamic mode. As a result, the controller of the fourth example makes it possible to shorten the time required for optimizing the D-axis current $i_d$, and to safely control the synchronous motor 100 so that the synchronous motor 100 does not brake so abruptly.

First, the operations in the dynamic mode and the regenerative mode will be described.

As described above, in the dynamic mode, the motor generates a mechanical output. In other words, an electrical power is supplied from the power supply to the motor. In the case of using a battery, the battery is discharging. On the other hand, in the regenerative mode, the motor is converting mechanical energy into electrical energy. In other words, an electrical power is input to the power supply. In the case of using a battery, the battery is being charged. The codes of the Q-axis current $i_q$ in the dynamic mode are inverse of the codes of the Q-axis current $i_q$ in the regenerative mode. Accordingly, as shown in FIG. 9, the vector of the induced voltage $\omega\Psi$ is inverse of the vector $R \cdot i_q$.

Figure 9A:
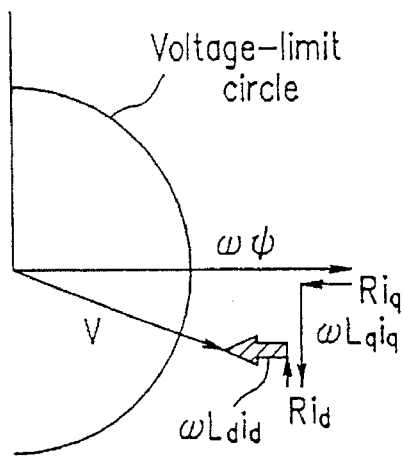
FIGS. 9A to 9C illustrate a flux-weakening control in a regenerative mode by way of vectors.
Figure 9B:
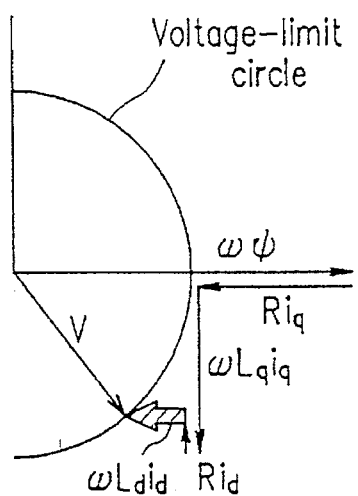
Figure 9C:
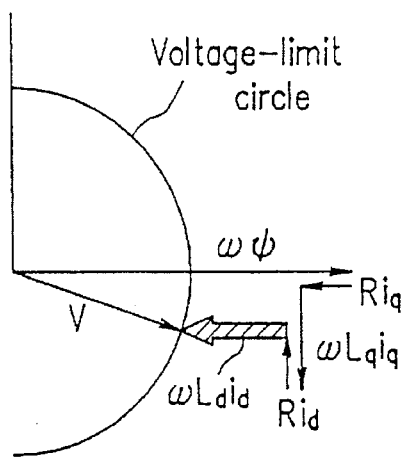

Next, the case will be described where the synchronous motor 100 is rotating at a high speed and the D-axis current $i_d$ is small. In such a case, the synthesized voltage value V exists outside of the voltage-limit circle, so that the synthesized voltage value V can not exist stably, as shown in FIG. 9A. If the amount of the flowing Q-axis current $i_q$ becomes larger than the commanded value, then the vector $R \cdot i_q$ in an inverse direction to the vector of the induced voltage $\omega\Psi$ becomes large, and therefore the synthesized voltage value V comes to exist inside the voltage-limit circle. In this way, a Q-axis current $i_q$ having a value larger than the commanded value comes to flow, as shown in FIG. 9B. Herein, in the case where the motor operates in the regenerative mode, the command value of the Q-axis current becomes negative with respect to the commanded negative torque as the commanded negative torque is not realized. In other words, a negative torque larger than the commanded value is generated, so that the motor brakes. In order to prevent the braking of the motor, it is necessary to provide a sufficiently large D-axis current $i_d$ for the motor, as shown in FIG. 9C. In the same way as the case where the motor operates in the dynamic mode, the amount of the D-axis current $i_d$ may be equal to the amount indispensable for the synthesized current value V to return to the inside of the voltage-limit circle. If the excessive amount of D-axis current $i_d$ over the indispensable amount is supplied, then the copper loss caused by the D-axis current $i_d$ degrades the efficiency.

Figure 10:
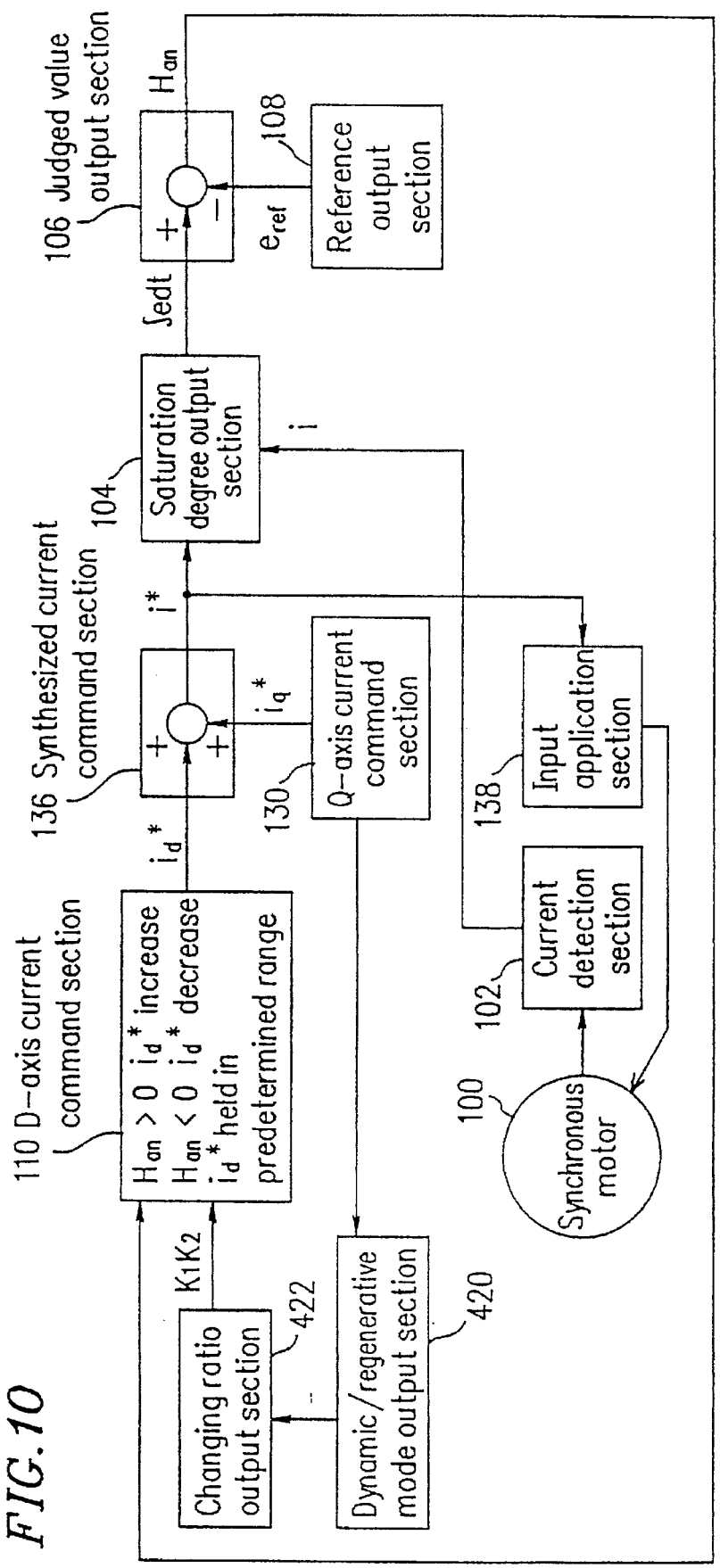
FIG. 10 is a block diagram showing the configuration of a controller for a permanent magnet synchronous motor according to a fourth example of the invention.

FIG. 10 is a block diagram showing the entire configuration of a controller for a permanent magnet synchronous motor 100 according to the fourth example of the invention. The controller of this fourth example further includes: a dynamic/regenerative mode judging section 420 and a changing ratio output section 422, as well as all the components of the controller of the first example. All the components other than the two sections 420 and 422 additionally provided are the same as those of the controller of the first example. The same components as those of the first example will be denoted by the same reference numerals and the description thereof will be omitted herein.

The judged value is obtained in the same way as in the first example. Then, based on the obtained judged value, the operations expressed by Equations 6 are performed by the D-axis current command section 110.

In the case where $H_{an} > 0$ and $i_d* < i_d*_{max}$, $$i_d*(i) = i_d*(i-1) + K_1 \cdot H_{an} \leq i_d*_{max}, \text{ where } K_1 > 0$$

In the case where $H_{an} > 0$ and $i_d* = i_d*_{max}$, $$i_d*(i) = i_d*(i-1)$$

In the case where $H_{an} < 0$ and $i_d* > i_d*_{min}$, $$i_d*_{min} \leq i_d*(i) = i_d*(i-1) + K_2 \cdot H_{an}, \text{ where } K_2 > 0$$

In the case where $H_{an} < 0$ and $i_d* = i_d*_{min}$ $$i_d*(i) = i_d*(i-1) \tag{6}$$

The changing ratio of $i_d*$ is determined by the predetermined constant values $K_1$ and $K_2$ in Equations 6. Alternatively, these constant values may be determined in the following manner.

The dynamic/regenerative mode judging section 420 judges whether the synchronous motor 100 operates in the dynamic mode or in the regenerative mode, thereby inputting the judged mode to the changing ratio output section 422.

More specifically, the dynamic/regenerative mode judging section 420 judges that the synchronous motor 100 operates in the dynamic mode if the codes of the command value $i_q*$ of the Q-axis current commanded by the Q-axis current command section 130 to be described later are positive. On the other hand, if the codes of the command value $i_q*$ of the Q-axis current are negative, the dynamic/regenerative mode judging section 420 judges that the synchronous motor 100 operates in the regenerative mode.

Then, the changing ratio output section 422 outputs $K_1$ and $K_2$ for the dynamic mode when the synchronous motor 100 operates in the dynamic mode, while the changing ratio output section 422 outputs $K_1$ and $K_2$ for the regenerative mode when the synchronous motor 100 operates in the regenerative mode. Then, the outputs $K_1$ and $K_2$ are input to the D-axis current command section 110. In actual operation, the outputs $K_1$ and $K_2$ can be obtained from a table.

By varying the changing ratio of the command value $i_d^*$ of the D-axis current in accordance with the operational mode of the motor in the above-described manner, a practical flux-weakening control is realized for the synchronous motor 100. The outputs $K_1$ and $K_2$ in the dynamic mode and the regenerative mode are set to be in the range of a hundredth to a half of the voltage limit value Im. This voltage limit value Im can be determined by the smaller one of the maximum amount of current which can flow through the semiconductor switches Q1 to Q6, the maximum amount of current which can flow through the respective lines, and the like. The maximum command value $i_d{^*}_{max}$ of the D-axis current is expressed by: $Im^* \cdot \sin 60° \leq I_d{^*}_{max} \leq Im^* \cdot \sin 90°$. The command value $i_d{^*}_{min}$ of the D-axis current is expressed by: $Im^* \cdot \sin 0° \leq i_d{^*}_{min} \leq Im^* \cdot \sin 40°$.

On the other hand, the changing ratio K can be obtained by the following equation.

$$K = K_0 \cdot \{i_d^*(i-1) - i_d^*(i-2)\} / \{H_{an}(i-1) - H_{an}(i-2)\}$$

K can not be calculated at the first operation when $H_{an} > 0$. Accordingly, K is set to be equal to $K_{min}$ (where, $K_{min} < K_0 < 1$).

The degree of effect of the D-axis current $i_d$ on the present judged value $H_{an}$ is calculated, and then the obtained value is used as the changing ratio, thereby rapidly obtaining the necessary D-axis current $i_d$.

The changing ratio herein corresponds to the gain of the controller. Accordingly, the increase in the changing ratio is equivalent to setting a gain so as to shorten the settling time. The changing ratio K can be set in the same way by using a control method such as PID, as described above.

Depending upon the necessity, unless the D-axis current $i_d$ is rapidly supplied to the synchronous motor 100 the response characteristics of the motor 100 are degraded. If too much D-axis current $i_d$ is supplied, then the efficiency is surely degraded but the response characteristics are not. In the case where a fast response characteristic is desired at the sacrifice of the efficiency, the changing ratio when the D-axis current $i_d$ increases is required to be set to be larger than the changing ratio when the D-axis current $i_d$ decreases. As a result, a controller exhibiting satisfactory response characteristics can be obtained.

However, for example, if the amount of energy to be supplied to the synchronous motor 100 becomes too small, then it is desirable to operate the synchronous motor 100 with a high efficiency, even at the sacrifice of the response characteristics.

In such a case, the changing ratio when the D-axis current $i_d$ increases is required to be set to be smaller than the changing ratio when the D-axis current $i_d$ decreases.

In this way, the setting can be switched between the state where the response characteristic is respected and the state where the efficiency is respected, in accordance with the required state.

In addition, in order to switch the setting between the state where the response characteristic is respected and the state where the efficiency is respected, the controller of the fourth example may be provided with an external switch.

Moreover, by continuously or discontinuously switching the ON/OFF states of the external switch, it is possible to vary the changing ratio of the command value of the D-axis current so as to obtain a desired response speed easily. The external switch is operated by the user.

Furthermore, by varying the command value (or the command speed) of the Q-axis current, it is also possible to attain the same effects as those obtained by varying the changing ratio of the D-axis current.

As described above, in the case where the amount of the D-axis $i_d$ is small and the synchronous motor 100 operates in the dynamic mode in the high-rotation region of the synchronous motor 100, the Q-axis current $i_q$ does not flow and therefore required torque can not be output. On the other hand, in the case where the synchronous motor 100 operates in the regenerative mode, excessive amount of Q-axis current $i_q$ flows and a negative torque is abruptly generated within a second. The abrupt generation of the negative torque causes an abrupt braking of the synchronous motor 100. The abrupt braking with respect to the rotating synchronous motor 100 is very dangerous. In order to rotate the synchronous motor safely, the changing ratio of the D-axis current $i_d^*$ is set to be large in the regenerative mode. As a result, a sufficient amount of D-axis current $i_d$ can flow through the synchronous motor rapidly, so that the abrupt braking can be prevented. Accordingly, the synchronous motor can rotate safely.

In Equation 3, if the reference $e_{ref}$ is set to be large, then the judged value $H_{an}$ becomes small. As a result, the command value $i_d^*$ of the D-axis current to be obtained by performing the operation expressed by Equations 6 can be settled to be small. On the other hand, if the reference $e_{ref}$ is set to be small, then the judged value $H_{an}$ becomes large. This fact indicates that the setting of the reference $e_{ref}$ controls the value of the command value $i_d^*$ of the D-axis current to be settled. Accordingly, if the reference $e_{ref}$ is set to be large, then it is possible to realize a highly efficient control in which $i_d^*$ can hardly flow. On the other hand, if the reference $e_{ref}$ is set to be small, then a large amount of the command value $i_d^*$ of the D-axis current flows, so that a control can be performed to follow the torque command precisely. Therefore, in the case where the synchronous motor operates in the dynamic mode, the reference $e_{ref}$ is set to be large, and the synchronous motor 100 is controlled so as to operate with a high efficiency. On the other hand, in the case where the synchronous motor operates in the regenerative mode, the reference $e_{ref}$ is set to be small, and the synchronous motor 100 is controlled so as to operate while following the torque command precisely, i.e., so as to prevent an abrupt braking.

As shown in FIGS. 2A to 2C and FIGS. 9A to 9C, the codes of the Q-axis current $i_q$ in the dynamic mode are different from the codes of the Q-axis current $i_q$ in the regenerative mode. When the operational mode changes, the codes of the Q-axis current $i_q$ also change, so that an indispensable amount of D-axis current $i_d$ is varied instantaneously. In actuality, by paying attention to $R \cdot i_q$, the amount of the D-axis current $i_d$ required in the regenerative mode is smaller than the amount of the D-axis current $i_d$ required in the dynamic mode.

Accordingly, when the operational mode changes from the dynamic mode to the regenerative mode, the indispensable amount of D-axis current $i_d$ decreases. On the other hand, when the operational mode changes from the regenerative mode to the dynamic mode, the indispensable amount of D-axis current $i_d$ increases. In order to promptly deal with such a rapid change of the D-axis current $i_d$, it is necessary to change the command value $i_d^*$ of the D-axis current based on an operation equation or a table when the operational mode changes.

Specifically, an operation expressed by the following Equation 15 is performed.

$$i_d^* = K_a(\omega - \omega_0) + K_b \cdot i_q^* \quad (15)$$

where, $i_q^* > 0$ in the dynamic mode and $i_q^* < 0$ in the regenerative mode; $i_{d\ min}^* \leq i_d^* \leq i_{d\ max}^*$; $K_a$ and $K_b$ are proportional constants and $\omega_0$ is a maximum rotation speed when the flux-weakening control is not performed. Alternatively, an operation expressed by the following Equation 16 may also be used.

$$i_{d\ new}^* = i_{d\ prev}^* - K_c i_{q\ prev}^* + K_d i_{q\ new}^* \quad (16)$$

where, $i_{d\ min}^* \leq i_d^* \leq i_{d\ max}^*$.

Herein, a new command value $i_{d\ new}^*$ of the D-axis current is a command value $i_d^*$ of the D-axis current to be newly set after the operational mode changes; $i_{d\ prev}^*$ is a command value $i_d^*$ of the D-axis current before the operational mode changes; $i_{q\ prev}^*$ is a command value $i_q^*$ of the Q-axis current before the operational mode changes; $i_q^*$ now is a command value $i_q^*$ of the Q-axis current after the operational mode changes; and $K_c$ and $K_d$ are constants. By setting these values, the D-axis current $i_d$ can rapidly respond to the change of the operational mode.

The command value $i_d^*$ of the D-axis current is varied by using Equations 15 and 16 and the like only once after the operational mode changes. From the second processing on, the command value $i_d^*$ of the D-axis current is determined by using Equation 6.

As described above, in an inverse salient-pole rotor, the command value $i_d^*$ of the total D-axis current is equal to the sum of the command value $i_d^*$ of the D-axis current corresponding to the reluctance torque and the command value $i_d^*$ of the D-axis current corresponding to the flux-weakening.

In general, such an inverse salient-pole rotor operates stably, though it depends on the changing ratio of the D-axis current in the dynamic mode and the permission value of the braking torque. However, when the command value $i_q^*$ of the Q-axis current, i.e., the torque command, decreases, the command value $i_d^*$ of the D-axis current corresponding to the reluctance torque also decreases, and therefore the command value $i_d^*$ of the total D-axis current also decreases. Accordingly, in the case where $i_q^*$ goes on decreasing from a large value and the operational mode abruptly changes into the regenerative mode, if the permission value of the braking torque is small, then the braking torque possibly exceeds the permission value. Thus, in the case where the command value $i_q^*$ of the Q-axis current abruptly decreases, the abrupt decrease of the command value $i_d^*$ of the D-axis current in conjunction with the abrupt decrease of the command value $i_q^*$ of the Q-axis current should be suppressed. That is to say, the controller is operated so that only the command value $i_d^*$ of the D-axis current corresponding to the flux-weakening is decreased without decreasing the command value $i_d^*$ of the D-axis current corresponding to the reluctance torque. As a result, it is possible to prevent the abrupt decrease of the command value $i_d^*$ of the total D-axis current. Consequently, the braking torque is generated within the permission value allowing for operating the synchronous motor 100 safely.

Next, the case where the dynamic/regenerative mode judging section 420 outputs the regenerative mode in a rotor structure in which a reluctance torque can be used will be described. For example, in the case where the D-axis current corresponding to the flux-weakening is supplied to the synchronous motor 100, a reluctance braking torque is generated by the D-axis current. Thus, in order to supply a constant braking torque to the synchronous motor 100, the amount of the Q-axis current to be supplied is reduced (or the amplitude of the Q-axis current is reduced) by the amount to be newly used as the D-axis current for obtaining a reluctance braking torque. As a result, a constant braking torque can be obtained and a stable operation is realized.

EXAMPLE 5

Hereinafter, a controller for a permanent magnet synchronous motor 100 according to a fifth example of the invention will be described with reference to the drawings. In this fifth example of the invention, the controller for a permanent magnet synchronous motor 100 allows for obtaining much regenerative current generated by the braking torque and can operate with a high efficiency.

Figure 11:
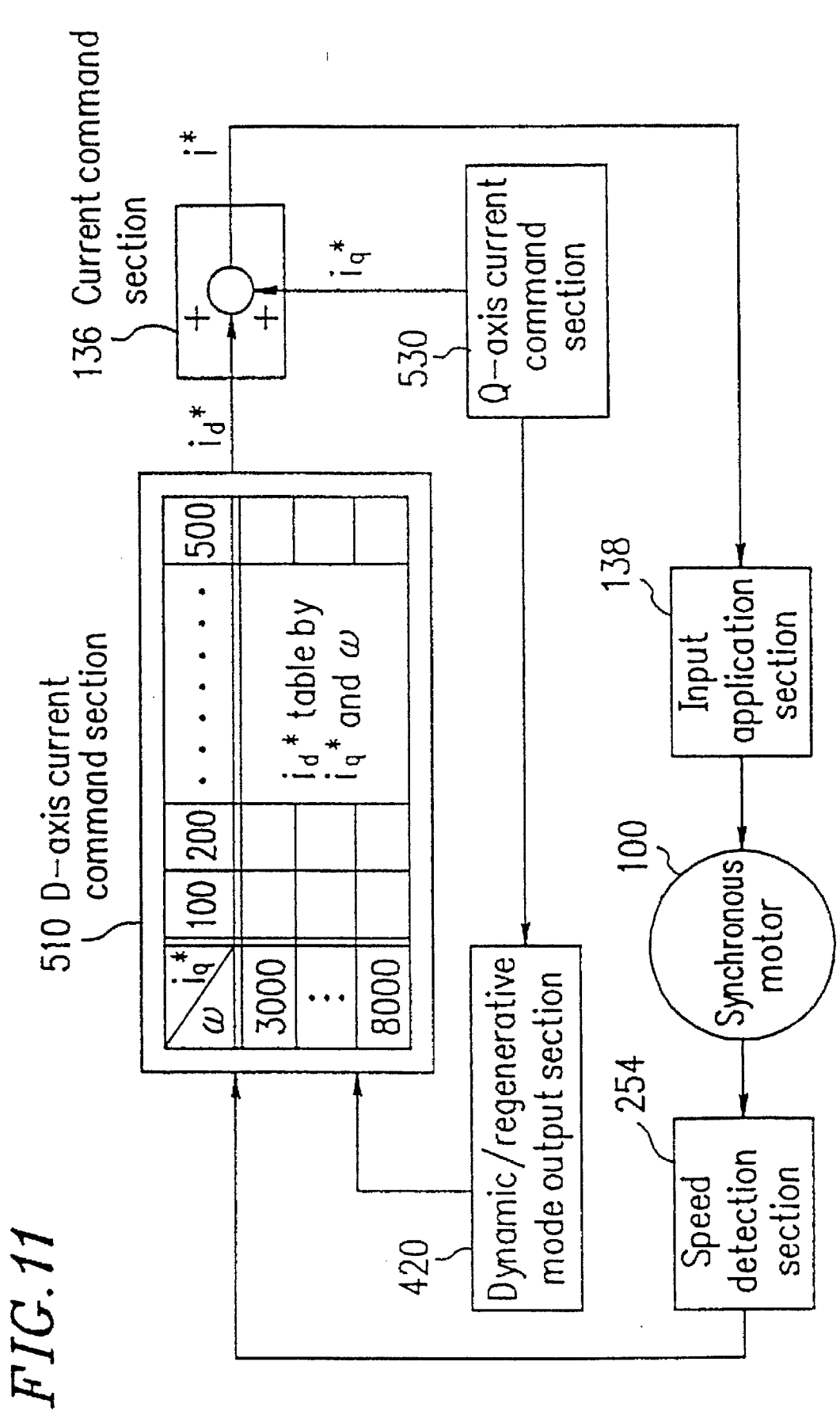
FIG. 11 is a block diagram showing the configuration of a controller for a permanent magnet synchronous motor according to a fifth example of the invention.

FIG. 11 is a block diagram showing the configuration of a controller for a permanent magnet synchronous motor 100 according to the fifth example of the invention. The controller of this fifth example additionally includes a speed detection section 254 but does not include the changing ratio output section 422, the current detection section 102, the error output section 104, the judged value output section 106 and the reference output section 108. The remaining components are the same as those of the controller of the fourth example, except that the Q-axis current command section 530 of this fifth example is different from the Q-axis current command section 130 of the fourth example.

The operation of the controller for a permanent magnet synchronous motor 100 having such a configuration will be described. In this fifth example, the controller does not perform a feedback control, but the synchronous motor 100 is controlled by providing the D-axis current $i_d$ and the Q-axis current $i_q$ by using a table or the like.

The controller of this example is different from the controllers of the foregoing examples in that the D-axis current command section 510 calculates the command value $i_d^*$ of the D-axis current by using a table, an operation equation, or the like based on the command value $i_q^*$ of the Q-axis current output from the Q-axis current command section 530 and the rotation speed output from the speed detection section 254.

Herein, in the case where the dynamic/regenerative mode judging section 420 outputs the regenerative mode so as not to generate the flux-weakening, the dynamic/regenerative mode judging section 420 sets the command value $i_d^*$ of the D-axis current to be zero or outputs the command value $i_d^*$ of the D-axis current in the inverse code with respect to the code (+ or −) of the command value $i_d^*$ of the D-axis current in the dynamic mode. The controller of the fifth example is applicable very effectively to a synchronous motor in which a reluctance torque can be used. The reason is as follows. In the regenerative mode, as shown in Equation 13, if $i_q < 0$ and $i_d < 0$, then the magnet torque of the first term functions as a braking torque. However, the reluctance torque functions in the dynamic mode. As a result, a total braking torque decreases, and therefore the regenerative current with respect to the braking torque can be increased.

In this fifth example, a feedback control is not performed. However, the above-described control is applicable to the feedback control. That is to say, if the judged value output from the judged value output section is a negative one, then it is judged that the flux-weakening control is not performed in the region and the command value $i_d^*$ of the D-axis current is set to be zero, or the command value $i_d^*$ of the D-axis current is output in the inverse code with respect to the code (+ or −) of the command value $i_d{}^*$ of the D-axis current in the dynamic mode.

On the other hand, if the judged value output from the judged value output section is a positive one, then $i_d$ is set to be larger than zero in order to control the braking torque, as described above.

EXAMPLE 6

Hereinafter, a controller for a permanent magnet synchronous motor 100 according to a sixth example of the invention will be described with reference to the drawings. In this sixth example of the invention, the controller for a permanent magnet synchronous motor 100 measures a voltage supplied to the synchronous motor 100 and determines the maximum value of the command value of the D-axis current based on the measured voltage so as to operate with a high efficiency.

Figure 12:
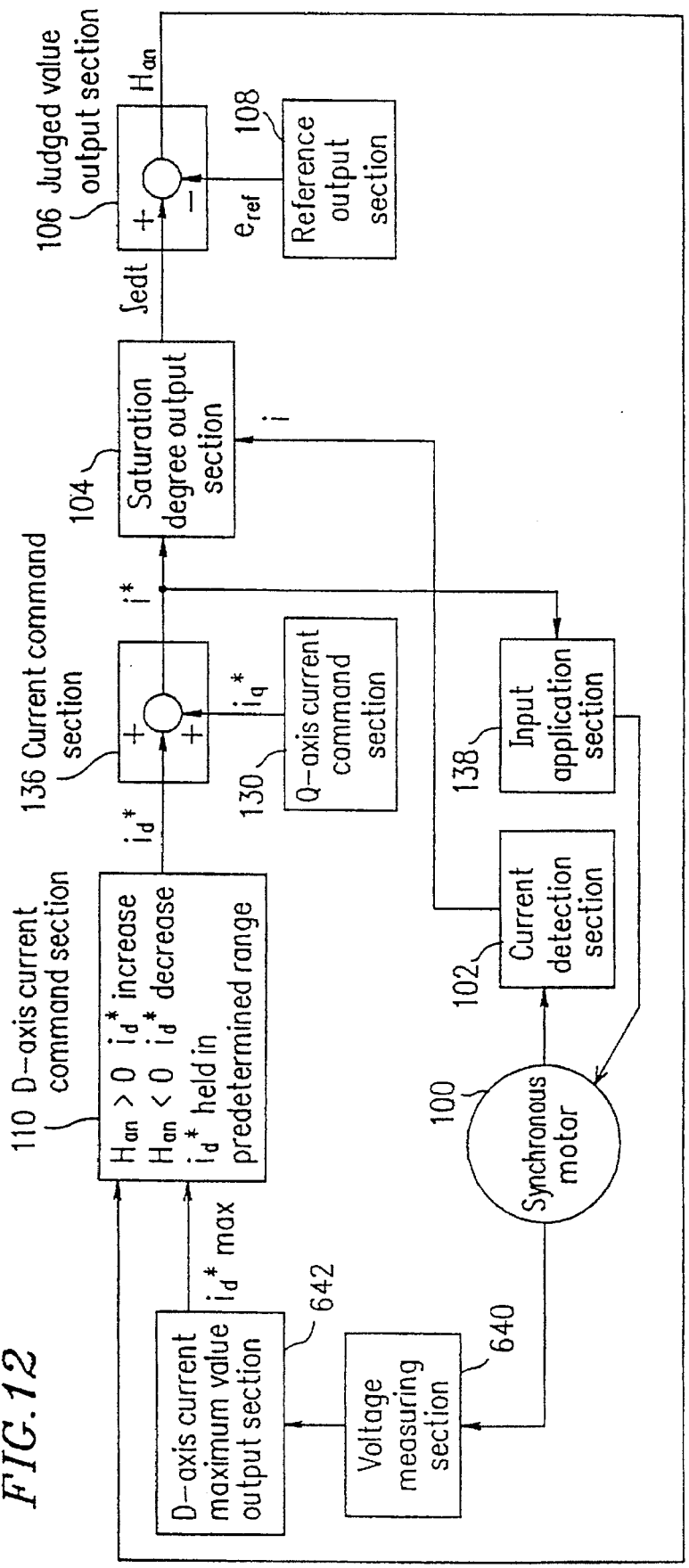
FIG. 12 is a block diagram showing the configuration of a controller for a permanent magnet synchronous motor according to a sixth example of the invention.

FIG. 12 is a block diagram showing the entire configuration of a controller for a permanent magnet synchronous motor 100 according to the sixth example of the invention. The controller of this sixth example additionally includes a voltage measuring section 640 and a D-axis current maximum value output section 642 as well as all the components of the controller of the first example. All the components other than the two additional sections operate in the same way as those of the first example, so the description thereof will be omitted herein. The operation of the controller for a permanent magnet synchronous motor 100 of the sixth example will be described with reference to FIG. 12.

A voltage V supplied to the synchronous motor 100 is measured by the voltage measuring section 640 so as to be output. Then, the voltage V is input to the D-axis current maximum value output section 642. The D-axis current maximum value output section 642 calculates and outputs a maximum value $i_d{}^*_{max}$ of the D-axis current from the voltage V (the maximum value $i_d{}^*_{max}$ will be obtained by Equation 18, etc. to be described later). The voltage V can be also obtained by measuring a voltage between the terminal a and the terminal b of the inverter shown in FIG. 4.

Then, the maximum value $i_d{}^*_{max}$ of the D-axis current is input to the D-axis current command section 110, and used for the operation expressed by Equations 6.

The remaining operations are the same as those of the first example, so the description thereof will be omitted herein.

As described above, by using the voltage V supplied to the synchronous motor 100, the maximum command value $i_d{}^*_{max}$ of the D-axis current can be varied. As a result, it is possible to provide a D-axis current allowing for generating an optimal amount of total current.

In the case of using a power supply such as a battery, as the discharge proceeds, the terminal voltage gradually lowers. As a result, the voltage V supplied to the synchronous motor 100 decreases and therefore the total current which can flow through the synchronous motor 100 also decreases. Herein, in the case where the maximum value $i_d{}^*_{max}$ of the D-axis current is constant, the ratio of the D-axis current to the total current becomes large, so the amount of the D-axis current is regarded to be excessive. As described in the first example, the amount of the D-axis current need not exceed an indispensable amount, and therefore too large an amount of the D-axis current naturally degrades the efficiency. The smaller the voltage V supplied to the synchronous motor 100 becomes, the smaller the maximum command value of the D-axis current should be.

Specifically, the operation as expressed by the following Equation 17 is conducted.

$$i_d{}^*_{max} = K_{battery} \cdot V \quad (17)$$

where $K_{battery}$ is a constant. The maximum value $i_d{}^*_{max}$ may be obtained by using other functions concerning the voltage V and other tables.

On the other hand, as the voltage to be supplied to the synchronous motor 100 decreases, the maximum command value $i_d{}^*_{max}$ of the D-axis current also decreases. As a result, the D-axis current for generating an optimal amount of total current can be provided, and the degradation of the efficiency can be prevented.

The configuration of this example is also applicable to the configuration of the fifth example in which the feedback control is not performed. In such a case, the degradation of the efficiency can also be prevented.

EXAMPLE 7

Hereinafter, a controller for a permanent magnet synchronous motor 100 according to a seventh example of the invention will be described with reference to the drawings. In this seventh example of the invention, the controller for a permanent magnet synchronous motor 100 can operate in various states by determining a specific operational state so as to set the references corresponding to the selected state.

Figure 13:
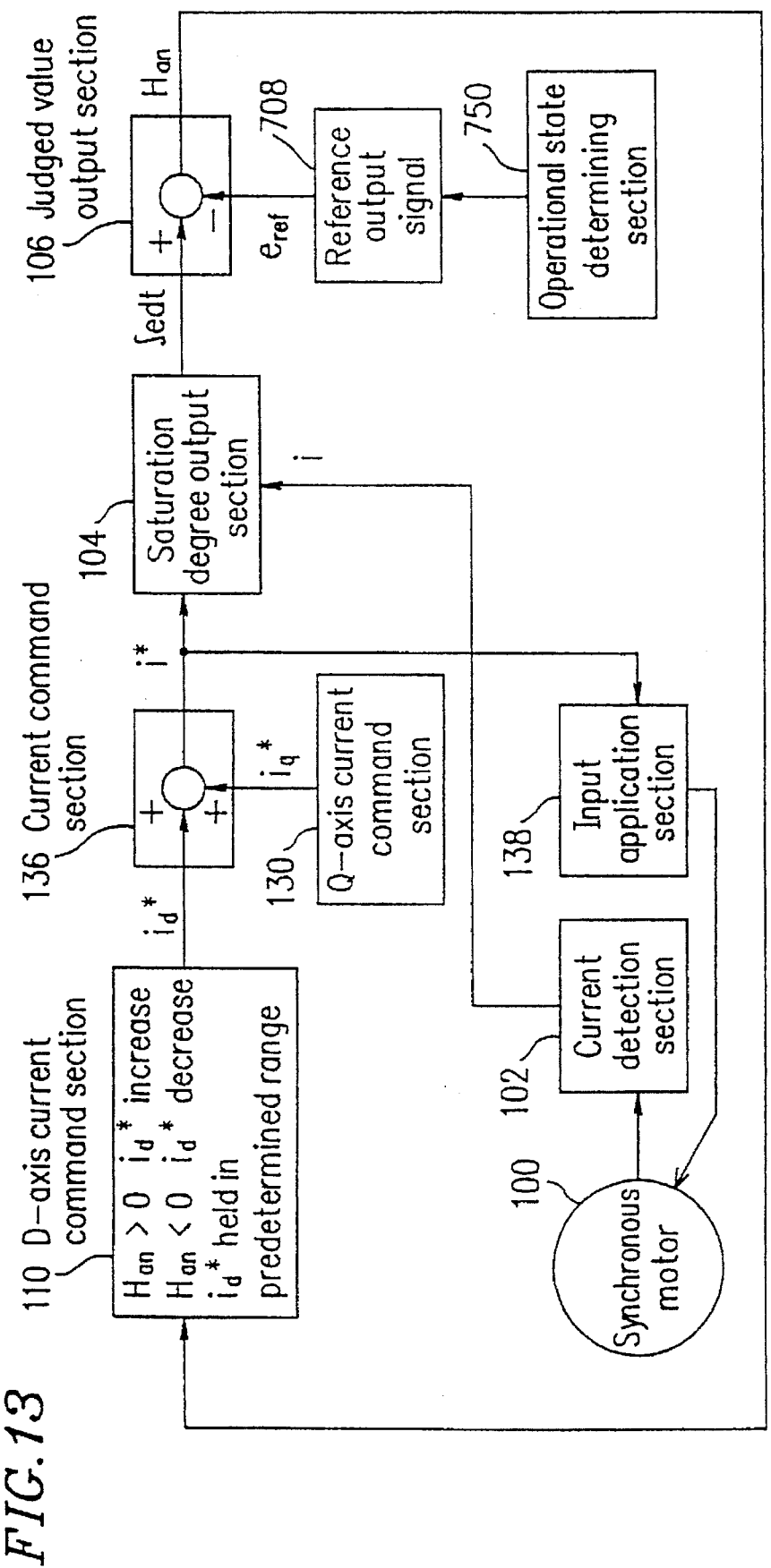
FIG. 13 is a block diagram showing the configuration of a controller for a permanent magnet synchronous motor according to a seventh example of the invention.

FIG. 13 is a block diagram showing the entire configuration of a controller for a permanent magnet synchronous motor 100 according to the seventh example of the invention. The controller of this seventh example additionally includes an operational state determining section 750 as well as all the components of the controller of the first example. However, a reference output section 708 of the seventh example is different from the reference output section 108 of the first example. The same components as those of the first example will be denoted by the same reference numerals and the description thereof will be omitted herein.

The operation of the controller for a permanent magnet synchronous motor 100 of the seventh example will be described with reference to FIG. 13.

First, the relationship between the reference value and the command value of the D-axis current in accordance with the operational state will be described.

The variation of the reference value causes the variation of the command value of the D-axis current. This is because a large reference value permits a large saturation degree (or a current error). In such a case, the amount of the D-axis current flowing through the synchronous motor 100 becomes insufficient. Accordingly, if a reference value is large, then the command value of the D-axis current becomes small. This relationship is obvious from Equations 6. On the contrary, if a reference value is small, then the command value of the D-axis current becomes large. By varying the reference value in this way, the command value of the D-axis current can be controlled.

In this case, if the torque is to be respected, then an operational state where the torque is respected is selected at the sacrifice of the efficiency, and then a reference value suitable for the operational state is provided. The command value of the D-axis current is produced based on this reference value, thereby realizing the necessary torque. On the other hand, if the motor is operated in an ordinary manner, then an operational state where a high efficiency is respected is selected, and then a reference value suitable for the operational state is provided. The command value of the D-axis current is produced based on this reference value, thereby realizing a high efficiency.

Based on the above-described principles, the synchronous motor 100 is controlled.

The operational state determining section 750 outputs one of the two operational states, i.e., an operational state where an efficiency is respected and an operational state where a torque is respected. The setting can be easily selected by using an external switch, for example. Then the selected operational state is input to the reference output section 708. The reference output section 708 determines a reference value in accordance with the selected operational state. More specifically, a table is produced beforehand by using a theoretical equation or by experiment. Then, based on the table thus produced, a reference value corresponding to each operational state is obtained. Thereafter, the corresponding reference value is output so as to be input to the judged value output section 106.

The remaining operations are the same as those of the first example, so the description thereof will be omitted herein.

In this way, the synchronous motor 100 is ordinarily operated with a high efficiency. Only when a torque is required, the operational state where the torque is respected is selected, so that the required torque is output.

In this example, the operational state determining section 750 outputs only two operational states. However, one operational state may be selected from three or more operational states.

In the case where the operational state determining section 750 outputs a command value equal to or larger than the predetermined maximum command value of the synthesized current, the operational state determining section 750 judges that the torque is to be respected. In such a case, the reference output section 708 outputs a reference value smaller than the reference value in the case where the efficiency is respected. As a result, the switching of the two operational states, where the torque and the efficiency are respected, respectively, can be automatically performed based on the command value of the total current. In FIG. 14, the region where the torque is respected and the region where the efficiency is respected are generated by performing the flux-weakening control. On the other hand, the ordinary region is indicated by the hatched lines in FIG. 14.

The same effects can be obtained by automatically switching the operational states where the torque and the efficiency are respected, respectively by using a torque current signal or the two signals of the torque current and the rotation speed, instead of the synthesized current.

As described above, as the amount of the D-axis current $i_d$ increases, the efficiency decreases. In order to suppress such degradation, in the case where the operational state where the efficiency is respected is commanded by an external switch or the like, the following three measures (1) to (3) can be taken.

(1) The maximum value of the synthesized current is lowered.

(2) The maximum rotation speed of the synchronous motor 100 is reduced.

(3) The maximum ratio of $i_d$ to $i_q$ (or a maximum phase lead angle of the current) is lowered. That is to say, by lowering the maximum value of $i_d$ as compared with $i_d$ in the case of respecting the torque, the efficiency can be improved.

Figure 15A:
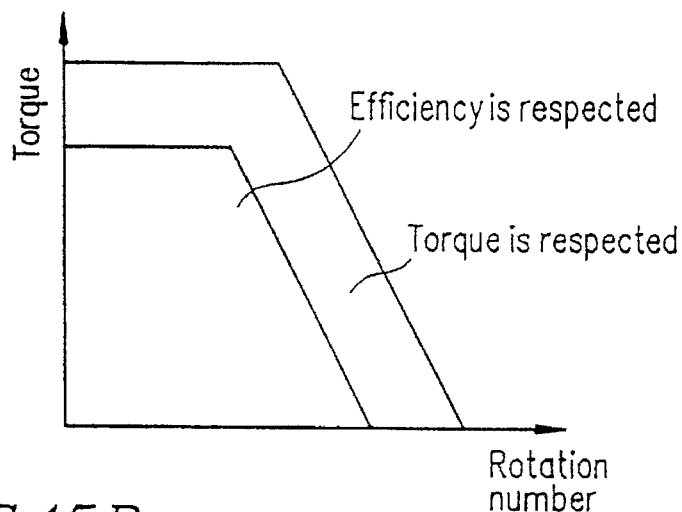
FIGS. 15A to 15C are graphs showing a relationship between a torque and a rotation speed for indicating the respective operational ranges to be automatically selected from the two operational states where an efficiency and a torque are respected, respectively.
Figure 15B:
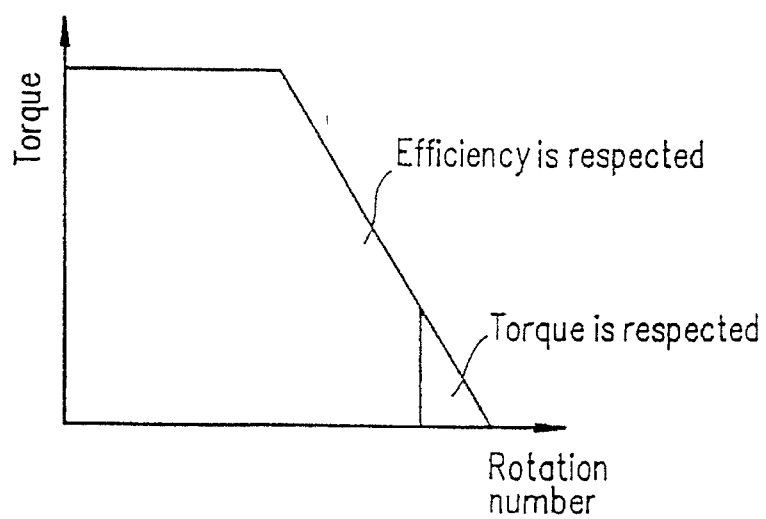
Figure 15C:
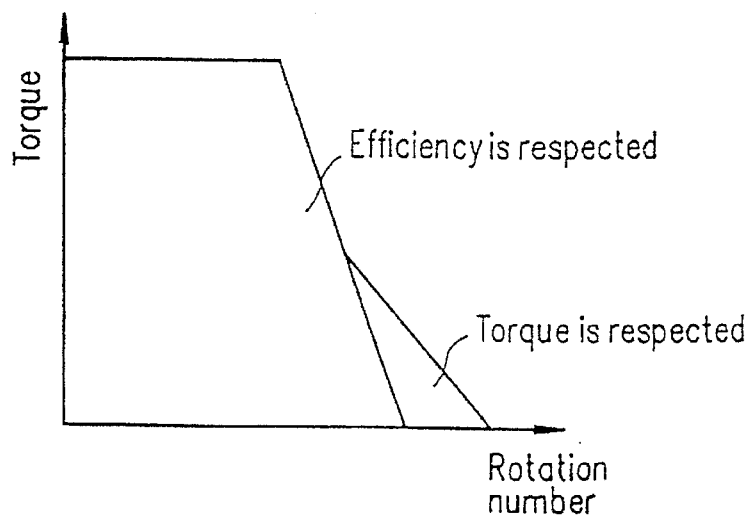

FIGS. 15A to 15C show the respective operational ranges of the non-salient pole motor when the above-described three measures (1) to (3) are taken (FIGS. 15A to 15C show the relationship between the torque and the rotation speed). As shown in FIGS. 15A to 15C, the synchronous motor 100 can be controlled so as to operate in either of the two operational states where the torque and the efficiency are respected, respectively.

The configuration of this example is applicable to the configuration of the fifth example where the feedback control is not performed.

EXAMPLE 8

Hereinafter, a controller for a permanent magnet synchronous motor 100 according to an eighth example of the invention will be described with reference to the drawings. In this eighth example of the invention, the judged value of the D-axis current and the reference value of Q-axis current are set separately. Accordingly, it is possible to separately control the settled value of the D-axis current and the settled value of the Q-axis current.

Figure 16:
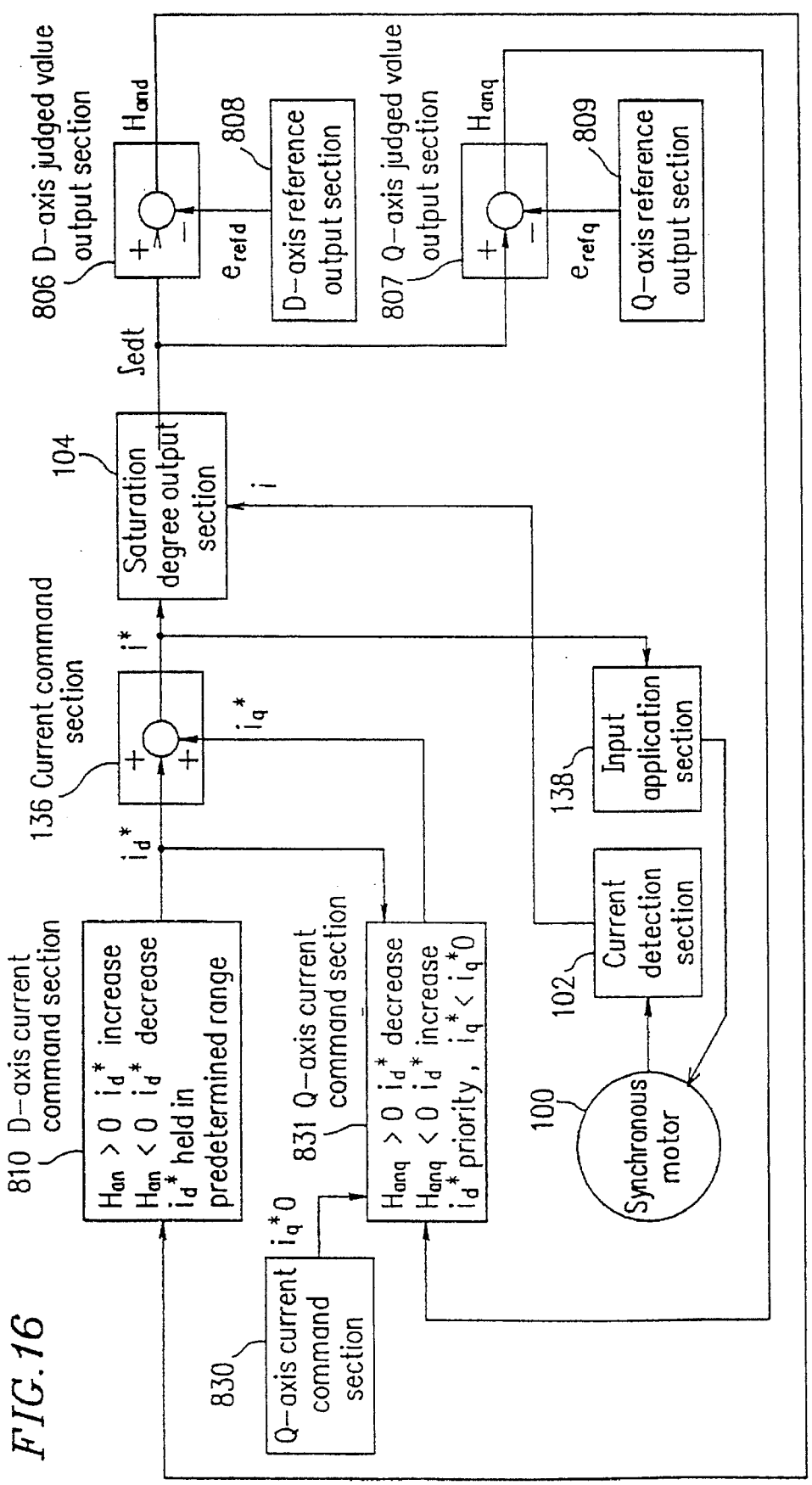
FIG. 16 is a block diagram showing the configuration of a controller for a permanent magnet synchronous motor according to an eighth example of the invention.

FIG. 16 is a block diagram showing the entire configuration of a controller for a permanent magnet synchronous motor 100 according to the eighth example of the invention. The controller of this eighth example additionally includes a D-axis judged value output section 806; a Q-axis judged value output section 807; a D-axis reference output section 808; a Q-axis reference output section 809; and a Q-axis current variation section 831 as well as all the components of the controller of the first example except for the judged value output section 106 and the reference output section 108. The D-axis current command section 810 and the Q-axis current command section 830 of the eighth example are different from the D-axis current command section 110 and the Q-axis current command section 130 of the first example. The same components as those of the first example will be denoted by the same reference numerals and the description thereof will be omitted herein.

The operation of the controller for a permanent magnet synchronous motor 100 of the eighth example will be described.

The saturation degree output section 104 integrates the current error e(t) obtained by subtracting the detected current value i(t) from the actual current command value i*(t) so as to output the integrated value. Then, the integrated value is input to the D-axis judged value output section 806 and the Q-axis judged value output section 807. The D-axis judged value output section 806 subtracts the reference value $e_{refd}$ set by the D-axis reference output section 808 from the integrated value of the current error e(t) as expressed by the following Equations 18. The D-axis judged value output section 806 outputs a judged value $H_{and}$ resulting from the subtraction.

In the same way, the Q-axis judged value output section 807 subtracts the reference value $e_{refq}$ set by the Q-axis reference output section 809 from the integrated value of the current error e(t) as expressed by the following Equations 18. The Q-axis judged value output section 807 outputs a judged value $H_{anq}$ resulting from the subtraction.

$$H_{and} = \int e(t)dt - e_{refd}$$

$$H_{anq} = \int e(t)dt - e_{refq} \quad (18)$$

In the same way as the operation of the first example, the reference values $e_{refd}$ and $e_{refq}$ are obtained by the operation expressed by the following Equations 19 using a half period T/2 of the error or by the operation expressed by the following Equations 20 using a speed ω, and then output.

$$e_{refd} = \text{constant value} \cdot T/2$$

$$e_{refq} = \text{constant value} \cdot T/2 \quad (19)$$

$$e_{refd} = \text{constant value}/\omega$$

$e_{refq}$=constant value/ω    (20)

Thereafter, in the same way as in the first example, the command value of the D-axis current is determined by the D-axis current command section 810. However, in this example, $H_{an}$ in Equations 6 is replaced by $H_{and}$ of the eighth example.

Generally, in the case of using a non-salient pole motor, the smaller the amount of the D-axis current $i_d$ becomes, the higher the efficiency becomes. Accordingly, in some cases, in order to suppress the degradation of the efficiency, the upper limit value of the D-axis current is reduced to about a half of the maximum current value though the characteristic is sacrificed a little, i.e., the characteristic is no longer a maximal one. In such a case, the D-axis current is reduced to a small value, the commanded Q-axis current can not flow. Accordingly, the command value of the Q-axis current is required to be calculated in the following way.

The Q-axis current command section 830 outputs the command value $i_q*_{-o}$ of the Q-axis current obtained by the operation expressed by Equation 8 or the like and then input the command value $i_q*_{-o}$ to the Q-axis current variation section 831. As expressed by the following Equation 21, in the case where the judged value $H_{anq}$ output from the Q-axis judged value output section 807 is positive and the upper limit of the command value of the D-axis current is $i_d*_{max}$, the Q-axis current variation section 831 lowers the command value $i_q*$ of the Q-axis current to be actually supplied from the previous command value $i_q*_{prev}$ of the Q-axis current by performing a similar operation to the variation of the D-axis current. In the case where the judged value $H_{anq}$ is negative; the command value of the D-axis current is the upper limit value $i_d*_{max}$; and the varied command value $i_q*(i)$ is equal to or smaller than $i_q*_{-o}$, the Q-axis current variation section 831 increases the command value of the Q-axis current. As a result, the command value $i_q*$ of the Q-axis current can be supplied as a current value to be actually supplied to the synchronous motor 100.

On the other hand, in the case where the above conditions are not satisfied, the Q-axis current variation section 831 outputs $i_q*_{-o}$ to the current command section 136 as the command value of the Q-axis current without varying $i_q*_{-o}$.

In the case where $H_{anq} > 0$ and $i_d* = i_d*_{max}$, $i_q*(i) = i_q*(i-1) + K_3 \times H_{anq} \leq i_q*_{-o} (K_3 < 0)$ In the case where $H_{anq} < 0$, $i_d* = i_d*_{max}$, and $i_q* < i_q*_{-o}$, $i_q*(i) = i_q*(i-1) + K_4 \cdot H_{anq} \leq i_q*_{-o} (K_4 < 0)$    (21)

where the command values $i_q*(i)$ and $i_q(i-1)$ of the Q-axis current are the previous and the present command values of the Q-axis current $i_q$.

Next, by controlling the current command values by varying the two reference values, the following effects can be obtained. In this case, if the reference value of the D-axis current is equal to the reference value of the Q-axis current, is equal to the reference value of the Q-axis current, then the two command values of the D-axis current and the Q-axis current can not be controlled separately. However, by separately supplying the two reference values of the D-axis current and the Q-axis current, the two judged values of the D-axis current and the Q-axis current can be output separately. Therefore, in this eighth example, it is possible to separately control the two command values of the D-axis current and the Q-axis current.

Next, the state where a required amount of D-axis current is a little larger than $i_d*_{max}$ and the D-axis current is increasing as expressed by Equations 6 will be described. Since the amount of the D-axis current $i_d*$ is small, the current error tends to be large, and since the D-axis judged value is positive, the D-axis current $i_d*$ tends to be increasing as expressed by Equations 6. The command value $i_d*$ of the D-axis current soon reaches $i_d*_{max}$.

If the reference value of the D-axis current is equal to the reference value of the Q-axis current, then the judged value of the D-axis current becomes equal to the judged value of the Q-axis current. Since the judged value of the Q-axis current is positive, the command value $i_q*$ of the Q-axis current decreases as expressed by Equation 21. Then, the command value $i_q*$ of the Q-axis current is settled when the command value $i_q*$ has decreased a little. If the current error decreases because the controller is interfered with by the noise or the like, then the command value $i_q*$ of the Q-axis current increases so as to become larger than $i_q*_{-o}$. On the other hand, the command value $i_d*$ of the D-axis current decreases. If a noise enters the controller of the invention, then the control of the command value $i_d*$ of the D-axis current and the command value $i_q*$ of the Q-axis current is required to be performed repeatedly.

In addition, since the current error is large, the command value $i_d*$ of the D-axis current decreases as expressed by Equations 21. As a result, the current error decreases, and the command value $i_q*$ of the Q-axis current increases as expressed by Equations 21. Since the command value $i_q*$ of the Q-axis current becomes larger than $i_q*_{-o}$, the command value $i_q*$ of the Q-axis current is set to be $i_q*_{-o}$. On the other hand, as expressed by Equations 6, the command value $i_d*$ of the D-axis current decreases. Therefore, in some cases, the control of the command values $i_d*$ and $i_q*$ of the D-axis current and the Q-axis current is performed repeatedly so as to increase the current error again.

Next, the state where the reference value of the D-axis current is smaller than the reference value of the Q-axis current; a required amount of D-axis current is a little larger than $i_d*_{max}$; and the D-axis current is increasing as expressed by Equations 6 will be described. Since the D-axis judged value is positive, $i_d*$ is increasing as expressed by Equation 7. The command value $i_d*$ of the D-axis current soon reaches $i_d*_{max}$. In this case, since the reference value of the D-axis current is smaller than the reference value of the Q-axis current, the Q-axis judged value becomes negative. Thus, the command value $i_q*$ of the Q-axis current is going to increase. However, since the command value $i_q*$ of the Q-axis current becomes larger than $i_q*_{-o}$, the command value $i_q*$ of the Q-axis current is, after all, held at $i_q*_{-o}$.

As described above, even when the current error is varied more or less because of the noise, the command value $i_q*$ of the Q-axis current is not varied. Consequently, it is no longer necessary to repeatedly control the command values $i_d*$ and $i_q*$ of the D-axis current and the Q-axis current.

Therefore, if the reference value of the D-axis current is set to be smaller than the reference value of the Q-axis current, then the same effects as a so-called "margin" can be obtained and a stable control can be performed.

EXAMPLE 9

Hereinafter, a controller for a permanent magnet synchronous motor 100 according to a ninth example of the invention will be described with reference to the drawings. A controller of this ninth example of the invention can drive the synchronous motor 100 even when some failure is generated in the above-described controller.

Figure 17:
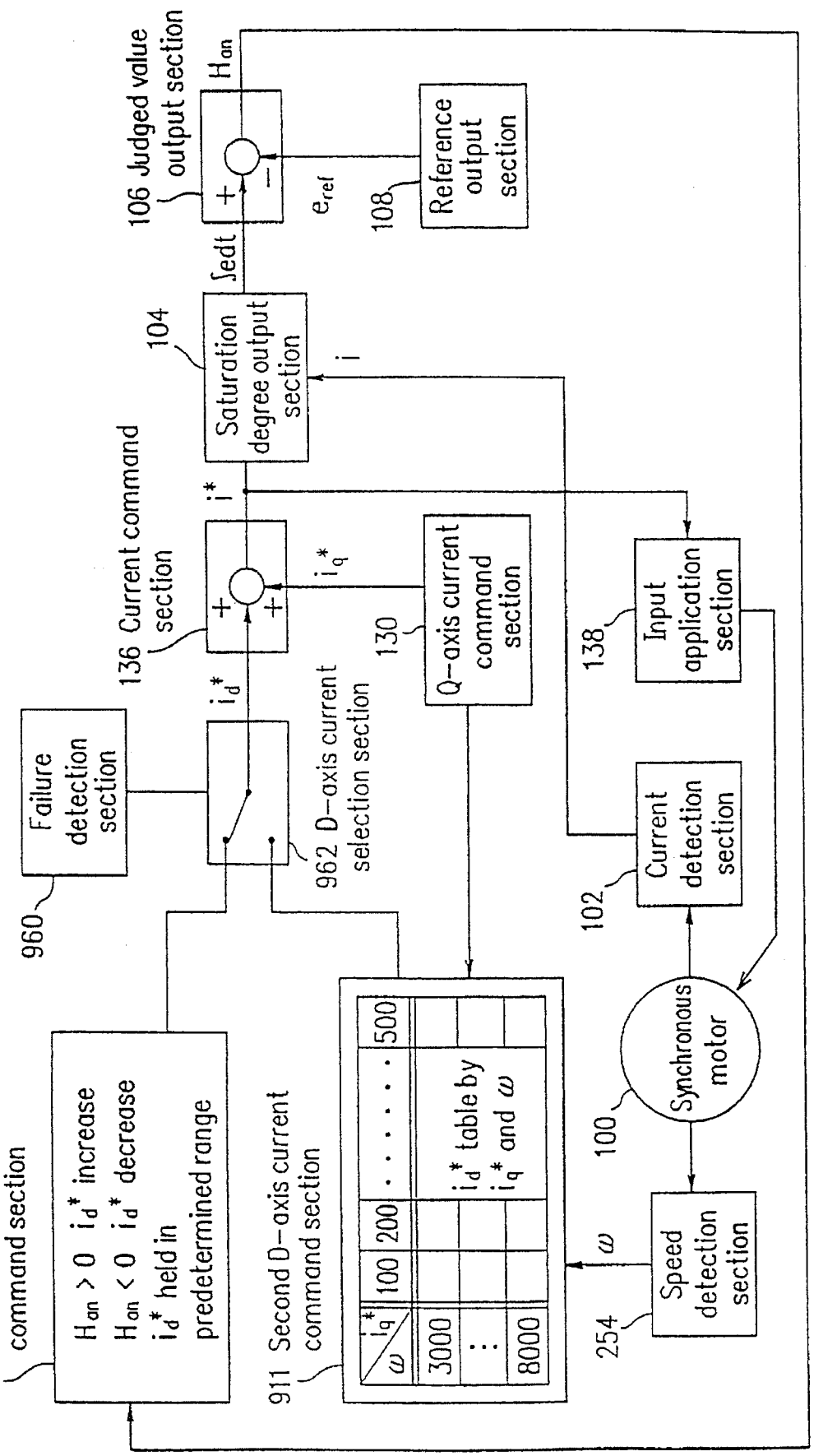
FIG. 17 is a block diagram showing the configuration of a controller for a permanent magnet synchronous motor according to a ninth example of the invention.

FIG. 17 is a block diagram showing the entire configuration of a controller for a permanent magnet synchronous motor 100 according to the ninth example of the invention. The controller of this ninth example additionally includes a speed detection section 254; a first D-axis current command section 910; a second D-axis current command section 911; a failure detection section 960; and a D-axis current selection section 962 as well as all the components of the controller of the first example except for the D-axis current command section 110. The same components as those of the first example will be denoted by the same reference numerals and the description thereof will be omitted herein.

First, the first D-axis current command section 910 operates in the same way as the D-axis current command section 110 of the first example, thereby outputting the command value of the D-axis current. On the other hand, the second D-axis current command section 911 operates in the same way as the D-axis current command section 510 of the fifth example, thereby outputting the command value of the D-axis current. The controller of the ninth example includes two D-axis current command sections. The failure detection section 960 detects the failure of the circuit or the operation and the position of the failure. If a failure is generated in the operation of the CPU, the synchronous motor 100 is operated at a fixed current phase (Though it is not shown in FIG. 17, a fixed current phase can be output easily by synchronizing the phase with that of the position detection signal for a motor in a general application). In the case where a failure is generated only in the integrator circuit for the controller, the command value of the D-axis current is required to be obtained from a table calculated from the predetermined rotation speed or the torque command current (the operation at the fixed current phase is naturally possible). The D-axis current selection section 962 ordinarily selects the command value of the D-axis output from the first D-axis current command section 910 for performing a feedback control. However, in the case where a failure is detected by the failure detection section 960, the D-axis current selection section 962 selects the command value of the D-axis current output from the second D-axis current command section 911.

It is noted that the failure detected by the failure detection section 960 includes failures of the sensors, i.e., the current detection section 110 and the speed detection section 254.

Consequently, the D-axis current command becomes possible even when a failure is generated, and the synchronous motor 100 can operate continuously.

In addition, the failure detection section 960 may be constituted by a switch or the like to be used simply for selecting the control operations. Then, the failure detection section 960 can be used as a switching section for controlling a table in the case where the fundamental operations other than the control are required to be examined before the consignment of the controller, etc.

In the foregoing examples, the present invention has been described as being applied to the cases where additional sections are provided for each controller of the examples. However, by combining these sections, combined effects can be obtained.

In the foregoing examples, a current flows through the stator of the synchronous motor. The stator of the synchronous motor means a winding of a synchronous motor for generating a rotating magnetic field when an alternate current is supplied. For example, in the case where a permanent magnet is fixed and does not move, the stator of the synchronous motor means an armature.

According to the present invention, it is at least possible to obtain the following effects.

Since the D-axis current command section adjusts the command value of the D-axis current to be an optimal value in accordance with the operational mode of the synchronous motor, the synchronous motor can be operated with a high efficiency even when the characteristics of the motor are varied because of the passage of time or the change of the environment. In addition, the current initial value output section includes the initial values of the command values of the D-axis current which are set by a table or the like, thereby shortening the time required for converging the command value of the D-axis current so as to be a desired command value of the D-axis current. Moreover, a dynamic/regenerative mode judging section judges the operational mode of the synchronous motor to be dynamic mode or a regenerative mode, so that an optimal amount of D-axis current can be supplied in the dynamic mode and the regenerative mode. The voltage measuring section measures a voltage supplied from a power supply to the synchronous motor so as to control the synchronous motor without performing a feedback control. Furthermore, in the case where the power supply is a battery or the like, it is possible to generate an appropriate command value of the D-axis current even if the voltage of the power supply drops.

Moreover, the operational state determining section determines the operational state by selecting from the two operational states where the efficiency and the torque are respected, respectively, so as to switch the reference value. As a result, the operation can be performed in various states. In addition, the D-axis current and the Q-axis current can be controlled separately, so that the response characteristics of the two command values of the D-axis current and the Q-axis current can be improved independently.

Furthermore, even if a failure occurs in a circuit or a system for performing a feedback control, the second D-axis current command section commands the value of the D-axis current based on a predetermined value, thereby controlling the synchronous motor.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A controller for a permanent magnet synchronous motor comprising:

a current command means for calculating current command values in respective phases of a stator from a command value of a D-axis current and a command value of a Q-axis current, thereby outputting the command values;

an input application means for supplying a current to the respective phases based on the command values of the currents in the respective phases;

a saturation degree output means for producing a saturation degree indicating an additional amount of the current to be supplied to the respective phases by the input application means;

a reference output means for outputting a reference value of the saturation degree;

a judged value output means for calculating a judged value by subtracting the reference value of the saturation degree from the saturation degree;

a D-axis current command means for leading the current phase and increasing the command value of the D-axis current so as to cause the judged value to be zero when the judged value is positive; decreasing the command value of the D-axis current when the judged value is negative; and holding the command value of the D-axis current at a predetermined minimum value when the decreasing command value of the D-axis current becomes smaller than the predetermined minimum value; and a Q-axis current command means for supplying a command value of the Q-axis current.

2. A controller for a permanent magnet synchronous motor according to claim 1, wherein the saturation degree output means produces the saturation degree based on a difference between at least one of the command values of the stator currents in the respective phases and values of phase currents of the permanent magnet synchronous motor.

3. A controller for a permanent magnet synchronous motor according to claim 1, wherein the saturation degree output means produces the saturation degree based on a value obtained by integrating a difference between the command value of the Q-axis current and a value of the Q-axis current flowing through the stator of the permanent magnet synchronous motor.

4. A controller for a permanent magnet synchronous motor according to claim 3, wherein the saturation degree output means comprises an integrator for integrating the difference, the integrator comprising a device to be changed into the controller in order to adjust an integration ratio of the integrator.

5. A controller for a permanent magnet synchronous motor according to claim 1, wherein the saturation degree output means produces the saturation degree based on a difference between a torque command value calculated based on at least a current command value and an actual value of a torque of the permanent magnet synchronous motor.

6. A controller for a permanent magnet synchronous motor according to claim 1, wherein the saturation degree output means produces the saturation degree based on a difference between a value obtained by integrating a command value of a current in at least one phase and a value obtained by integrating the command value of the phase current flowing through the stator of the permanent magnet synchronous motor.

7. A controller for a permanent magnet synchronous motor according to claim 1, wherein, in a case where the judged value is positive, the D-axis current command means increases the command value of the D-axis current; and the D-axis current command means sets the command value of the D-axis current to be a predetermined maximum value when the increasing command value of the D-axis current is larger than the predetermined maximum value;

and wherein, in a case where the judged value is negative, the D-axis current command means decreases the command value of the D-axis current; and the D-axis current command means sets the command value of the D-axis current to be a predetermined minimum value of the D-axis current when the decreasing command value of the D-axis current is smaller than the predetermined minimum value.

8. A controller for a permanent magnet synchronous motor according to claim 1, wherein, in a case where the judged value is positive, the D-axis current command means increases the command value of the D-axis current; in a case where the judged value is negative, the D-axis current command means decreases the command value of the D-axis current; and in a case where the decreasing command value of the D-axis current is smaller than a predetermined minimum value of the D-axis current, the D-axis current command means sets the command value of the D-axis current to be the predetermined minimum value, and wherein the Q-axis current command means selects a smaller one from a value obtained by vector subtracting the command value of the D-axis current from a predetermined maximum value of a synthesized current value obtained by vector adding the command value of the D-axis current and the command value of the Q-axis current, and the command value of the Q-axis current.

9. A controller for a permanent magnet synchronous motor according to claim 1, further comprising:

a speed detection means for detecting a rotation speed of the permanent magnet synchronous motor;

a variation timing output means for outputting a timing for forcibly varying the command value of the D-axis current, in a case where the command value of the D-axis current is within a certain range and a value of the rotation speed is within a certain range during a certain period;

a D-axis current variation means for varying the command value of the D-axis current by holding at a constant value a synthesized current command value obtained by synthesizing the command value of the D-axis current and the command value of the Q-axis current, when the varied timing is output; and a D-axis current update means for updating the command value of the D-axis current, wherein, after the D-axis current variation means varies the command value of the D-axis current, when the rotation speed becomes larger than a rotation speed before the command value of the D-axis current is varied, the D-axis current update means performs a first operation of using the command value of the D-axis current after the command value of the D-axis current is varied; and when the rotation speed becomes smaller than the rotation speed before the command value of the D-axis current is varied, the D-axis current update means performs a second operation of using the command value of the D-axis current before the command value of the D-axis current is varied, the D-axis current update means repeatedly performing the first operation or the second operation during the period permitted by the variation timing output means, and wherein, in a case where the D-axis current update means updates the command value of the D-axis current and the judged value is positive, the D-axis current update means changes the reference value output from the reference output means into a reference value newly calculated; and in a case where the D-axis current update means updates the command value of the D-axis current and the judged value is negative, the D-axis current update means sets a predetermined minimum value of the D-axis current, or a coefficient of an equation for calculating the command value of the D-axis current, based on a value output to the D-axis current command means from the D-axis current update means.

10. A controller for a permanent magnet synchronous motor according to claim 1, further comprising a current initial value output means for outputting an initial value of the D-axis current obtained from the command value of the Q-axis current, in a case where a command value of the Q-axis current becomes equal to or larger than a predetermined value.

11. A controller for a permanent magnet synchronous motor according to claim 1, further comprising a changing ratio output means for determining and outputting a changing ratio of the command value of the D-axis current, wherein the changing ratio output means outputs a predetermined constant changing ratio or a changing ratio calculated from the judged value and the command value of the D-axis current;

and wherein, in a case where the judged value is positive, the D-axis current command means increases the command value of the D-axis current based on the changing ratio, while in a case where the command value of the D-axis current becomes larger than a predetermined maximum value, the D-axis current command means holds the command value of the D-axis current at the predetermined maximum value;

and wherein, in a case where the judged value is negative, the D-axis current command means decreases the command value of the D-axis current based on the changing ratio, while in a case where the command value of the D-axis current becomes smaller than a predetermined minimum value, the D-axis current command means holds the command value of the D-axis current at the predetermined minimum value.

12. A controller for a permanent magnet synchronous motor according to claim 11, wherein the changing ratio when the judged value is positive is larger than the changing ratio when the judged value is negative.

13. A controller for a permanent magnet synchronous motor according to claim 11, wherein the changing ratio output means comprises at least two changing ratios and the at least two changing ratios are selected.

14. A controller for a permanent magnet synchronous motor according to claim 11, further comprising a dynamic/regenerative mode judging means for judging whether an operational mode of the permanent magnet synchronous motor is dynamic or regenerative, wherein the changing ratio output means determines the changing ratio of the command value of the D-axis current based on the judged mode.

15. A controller for a permanent magnet synchronous motor according to claim 14, wherein the changing ratio of the command value of the D-axis current in the dynamic mode is smaller than the changing ratio of the command value of the D-axis current in the regenerative mode.

16. A controller for a permanent magnet synchronous motor according to claim 14, wherein the reference output means varies the reference value based on an output from the dynamic/regenerative mode judging means.

17. A controller for a permanent magnet synchronous motor according to claim 14, wherein, in a case where the judged value is positive, the D-axis current command means increases the command value of the D-axis current based on the changing ratio, while in a case where the command value of the D-axis current becomes larger than a predetermined maximum value, the D-axis current command means holds the command value of the D-axis current at the predetermined maximum value; and in a case where the judged value is negative, the D-axis current command means decreases the command value of the D-axis current based on the changing ratio, while in a case where the command value of the D-axis current becomes smaller than a predetermined minimum value, the D-axis current command means holds the command value of the D-axis current at the predetermined minimum value;

and wherein, the dynamic/regenerative mode judging means produces a signal indicating a variation of the dynamic or regenerative operational mode, thereby varying the command value of the D-axis current from a previous command value of the D-axis current based on at least one of the rotation speed of the permanent magnet synchronous motor and the command value of the Q-axis current.

18. A controller for a permanent magnet synchronous motor according to claim 14, wherein, in a case where a permission value of a braking torque of the permanent magnet synchronous motor is smaller than a predetermined value, the D-axis current command means prevents an abrupt decrease in the command value of the D-axis current in order to suppress a decrease in the D-axis current for causing a reluctance torque generating in accordance with a decrease in a torque command value.

19. A controller for a permanent magnet synchronous motor according to claim 1, wherein the saturation degree output means produces the saturation degree based on a value obtained by integrating a difference between a current in at least one phase and a current command value in a phase corresponding to the at least one phase.

20. A controller for a permanent magnet synchronous motor according to claim 19, wherein the saturation degree output means further includes an integrator for integrating the difference, and the integrator includes a device to be changed into the controller for adjusting a ratio of the integration.

21. A controller for a permanent magnet synchronous motor according to claim 1, wherein, in a case where the judged value is positive, the D-axis current command means increases the command value of the D-axis current; while, in a case where the increasing command value of the D-axis current becomes larger than a predetermined maximum value, the D-axis current command means holds the command value of the D-axis current at the predetermined maximum value, and wherein, in a case where the judged value is negative, the D-axis current command means decreases the command value of the D-axis current; while, in a case where the rotation speed of the permanent magnet synchronous motor is equal to or smaller than a predetermined rotation speed, the D-axis current command means sets the command value of the D-axis current to be a predetermined minimum value.

22. A controller for a permanent magnet synchronous motor according to claim 1, wherein the reference output means varies the reference value based on at least one of the current command values in the respective phases and the rotation speed of the permanent magnet synchronous motor.

23. A controller for a permanent magnet synchronous motor comprising:

a current command means for calculating current command values in respective phases of a stator from a command value of a D-axis current and a command value of a Q-axis current, thereby outputting the command values;

an input application means for supplying a current to the respective phases based on the current command values in the respective phases;

a dynamic/regenerative mode judging means for judging whether an operational mode of the permanent magnet synchronous motor is dynamic or regenerative;

a Q-axis current command means for providing the command value of the Q-axis current; and a D-axis current command means for outputting the command value of the D-axis current based on the command value of the Q-axis current and a rotation speed in order to generate a dynamic reluctance torque equal to or larger than zero in the permanent magnet synchronous motor, in a case where the dynamic/regenerative mode judging means judges the operational mode to be regenerative and a rotation speed and a torque of the permanent magnet synchronous motor do not exist in a flux-weakening region.

24. A controller for a permanent magnet synchronous motor comprising:

a current command means for calculating current command values in respective phases of a stator from a command value of a D-axis current and a command value of a Q-axis current, thereby outputting the command values;

an input application means for supplying a current to the respective phases based on the current command values in the respective phases;

a dynamic/regenerative mode judging means for judging whether an operational mode of the permanent magnet synchronous motor is dynamic or regenerative;

a D-axis current command means for providing the command value of the D-axis current based on values for the regenerative mode in a case where the dynamic/regenerative mode judging means judges the operational mode to be regenerative, and for providing the command value of the D-axis current based on values for the dynamic mode in a case where the dynamic/regenerative mode judging means judges the operational mode to be dynamic; and a Q-axis current command means for reducing the command value of the Q-axis current in accordance with an increment of the command value of the D-axis current caused by a generation of a reluctance torque in a case where the command value of the D-axis current is not zero.

25. A controller for a permanent magnet synchronous motor comprising:

a current command means for calculating current command values in respective phases of a stator from a command value of a D-axis current and a command value of a Q-axis current, thereby outputting the command values;

an input application means for supplying a current to the respective phases based on the current command values in the respective phases;

a saturation degree output means for producing a saturation degree indicating an additional amount of the current to be supplied to the respective phases by the input application means;

a reference output means for outputting a reference value of the saturation degree;

a judged value output means for outputting a judged value by subtracting the reference value of the saturation degree from the saturation degree;

a voltage measuring means for measuring a voltage applied to an inverter, thereby outputting a value of the measured voltage;

a D-axis current maximum value output means for outputting a maximum command value of the D-axis current based on the value of the measured voltage;

a D-axis current command means for increasing the command value of the D-axis current when the judged value is positive; holding the command value of the D-axis current at the maximum value of the D-axis current when the increasing command value of the D-axis current becomes larger than the maximum value of the D-axis current; decreasing the command value of the D-axis current when the judged value is negative; and holding the command value of the D-axis current at a predetermined minimum value of the decreasing D-axis current when the decreasing command value of the D-axis current becomes smaller than the predetermined minimum value of the D-axis current; and a Q-axis current command means for providing a command value of the Q-axis current.

26. A controller for a permanent magnet synchronous motor according to claim 25, wherein the D-axis current maximum value output means reduces the maximum command value of the D-axis current if the value of the measured voltage decreases.

27. A controller for a permanent magnet synchronous motor comprising:

a current command means for calculating current command values in respective phases of a stator from a command value of a D-axis current and a command value of a Q-axis current, thereby outputting the command values;

an input application means for supplying a current to the respective phases based on the current command values in the respective phases;

a voltage measuring means for measuring a voltage applied to an inverter, thereby outputting a value of the measured voltage;

a D-axis current command means for reducing a maximum command value of the D-axis current provided by the D-axis current command means if the value of the measured voltage decreases; and a Q-axis current command means for providing a command value of the Q-axis current.

28. A controller for a permanent magnet synchronous motor comprising:

a current command means for calculating current command values in respective phases of a stator from a command value of D-axis current and a command value of a Q-axis current, thereby outputting the command values;

an input application means for supplying a current to the respective phases based on the current command values in the respective phases;

a saturation degree output means for producing a saturation degree indicating an additional amount of the current to be supplied to the respective phases by the input application means;

an operational state determining means for outputting one of two operational states where a first of the two operational states is indicative of a state in which operation of the motor is governed by predetermined efficiency requirements, and a second of the two operational states is indicative of a state in which the operation of the motor is governed by predetermined torque requirements;

a reference output means for outputting a reference value of the saturation degree based on the operational state;

a judged value output means for outputting a judged value by subtracting the reference value of the saturation degree from the saturation degree;

a D-axis current command means for leading a current phase and increasing the command value of the D-axis current so that the judged value becomes zero when the judged value is positive; and a Q-axis current command means for providing a command value of the Q-axis current.

29. A controller for a permanent magnet synchronous motor according to claim 28, wherein a reference value when the operational state determining means outputs the first operational state is larger than a reference value when the operational state determining means outputs the second operational state.

30. A controller for a permanent magnet synchronous motor according to claim 28, wherein, in the case where at least one of a rotation speed and a current of the permanent magnet synchronous motor exceeds each predetermined value, the operational state determining means determines the operational state to be the second operational state, and the reference output means outputs a reference value smaller than a reference value in a case of the first operational state.

31. A controller for a permanent magnet synchronous motor comprising:

a current command means for calculating current command values in respective phases of a stator from a command value of a D-axis current and a command value of a Q-axis current, thereby outputting the command values;

an input application means for supplying a current to the respective phases based on the current command values in the respective phases;

an operational state determining means for outputting one of two operational states where a first of the two operational states is indicative of a state in which operation of the motor is governed by predetermined efficiency requirements, and a second of the two operational states is indicative of a state in which the operation of the motor is governed by predetermined torque requirements;

a D-axis current command means for providing a command value of the D-axis current so that a command value of the D-axis current in a case of the first operational state is smaller than a command value of the D-axis current in a case of the second operational state; and a Q-axis current command means for providing a command value of the Q-axis current.

32. A controller for a permanent magnet synchronous motor comprising:

a current command means for calculating current command values in respective phases of a stator from a command value of a D-axis current and a command value of a Q-axis current, thereby outputting the command values;

an input application means for supplying a current to the respective phases based on the current command values in the respective phases;

a saturation degree output means for producing a saturation degree indicating an additional amount of the current supplied to the respective phases by the input application means;

a reference output means for outputting;

a D-axis reference output means for outputting a reference value of the D-axis in accordance with the saturation degree;

a Q-axis reference output means for outputting a reference value of the Q-axis in accordance with the saturation degree;

a D-axis judged value output means for outputting a judged value of the D-axis based on a value obtained by subtracting the reference value of the D-axis from the saturation degree;

a Q-axis judged value output means for outputting a judged value of the Q-axis based on a value obtained by subtracting the reference value of the Q-axis from a processed value of the saturation degree;

a D-axis current command means for increasing the command value of the D-axis current in a case where the judged value of the D-axis is positive; holding the command value of the D-axis current at a predetermined maximum value in a case where the increasing command value of the D-axis current becomes larger than the predetermined maximum value; decreasing the command value of the D-axis current in a case where the judged value of the D-axis is negative; and holding the command value of the D-axis current at a predetermined minimum value in a case where the command value of the decreasing command value of the D-axis current becomes smaller than the predetermined minimum value;

a Q-axis current command means for providing a command value of the Q-axis current; and a Q-axis current variation means for decreasing the command value of the Q-axis current commanded by the Q-axis current command means and regarding the decreasing command value of the Q-axis current as a varied command value of the Q-axis current in a case where the judged value of the Q-axis is positive and the command value of the D-axis current is the predetermined maximum value; and for increasing the command value of the Q-axis current in a case where the judged value of the Q-axis is negative, the command value of the D-axis current is the predetermined maximum value, and the varied command value of the Q-axis current is equal to or smaller than the command value of the Q-axis current commanded by the Q-axis current command means.

33. A controller for a permanent magnet synchronous motor according to claim 32, wherein the reference value of the D-axis output from the D-axis reference output means is smaller than the reference value of the Q-axis output from the Q-axis reference output means.

34. A controller for a permanent magnet synchronous motor comprising:

a current command means for calculating current command values in respective phases of a stator from a command value of a D-axis current and a command value of a Q-axis current, thereby outputting the command values;

an input application means for supplying a current to the respective phases based on the current command values in the respective phases;

a saturation degree output means for producing a saturation degree indicating an additional amount of the current to be supplied to the respective phases by the input application means;

a reference output means for outputting a reference value of the saturation degree based on the operational state;

a judged value output means for outputting a judged value obtained by subtracting the reference value of the saturation degree from the saturation degree;

a first D-axis current command means for leading a current phase and increasing the command value of the D-axis current so that a judged value becomes zero if the judged value is positive;

a failure detection means for detecting a failure of a circuit or an operation associated with the control of the motor;

a second D-axis current command means for calculating the command value of the D-axis current based on a predetermined table or operation equation;

a Q-axis current command means for providing a command value of the Q-axis current; and a D-axis current selection means for selecting the command value of the D-axis current output from the first D-axis current command means in a case where the failure detection means does not detect a failure of a circuit or an operation; and for selecting the command value of the D-axis current output from the second D-axis current command means in a case where the failure detection means detects a failure of a circuit or an operation.

35. A controller for a permanent magnet synchronous motor comprising:

a current command means for calculating current command values in respective phases of a stator from a command value of a D-axis current and a command value of a Q-axis current, thereby outputting the command values;

an input application means for supplying a current to the respective phases based on the current command values in the respective phases;

a dynamic/regenerative mode judging means for judging whether an operational mode of the permanent magnet synchronous motor is dynamic or regenerative;

a Q-axis current command means for providing the command value of the Q-axis current; and a D-axis current command means for outputting the command value of the D-axis current based on the command value of the Q-axis current and a rotation speed in order to generate a dynamic reluctance torque equal to or larger than zero in the permanent magnet synchronous motor, in a case where the dynamic/regenerative mode judging means judges the operational mode to be regenerative and a rotation speed and a torque of the permanent magnet synchronous motor do not exist in a flux-weakening region and, in a case where the dynamic/regenerative mode judging means judges the operational mode to be dynamic, the D-axis current command means outputs the command value of the D-axis current in an inverse code with respect to the code in the regenerative operational mode.

* * * * *